US012796704B2

(12) United States Patent
Deng et al.

(10) Patent No.: US 12,796,704 B2

(45) Date of Patent: Nov. 17, 2026

(54) FLAXSEED PLANT MILK WITH GOOD FLAVOR, SELF-STABILIZATION AND FUNCTIONAL ACTIVITY BASED ON INTERFACE CONTROL AND PREPARATION METHOD AND APPLICATION THEREOF

(71) Applicant: OIL CROPS RESEARCH INSTITUTE, CHINESE ACADEMY OF AGRICULTURAL SCIENCES, Wuhan (CN)

(72) Inventors: Qianchun Deng, Wuhan (CN); Yashu Chen, Wuhan (CN); Chen Yang, Wuhan (CN); Xiao Yu, Wuhan (CN); Qi Zhou, Wuhan (CN); Shan Zhang, Wuhan (CN); Xia Xiang, Wuhan (CN); Chuyun Wan, Wuhan (CN); Hongjian Chen, Wuhan (CN); Dengfeng Peng, Wuhan (CN); Qian Hao, Wuhan (CN)

(73) Assignee: OIL CROPS RESEARCH INSTITUTE, CHINESE ACADEMY OF AGRICULTURE SCIENCES, Wuhan (CN)

( * ) Notice: Subject to any disclaimer, the term of this patent is extended or adjusted under 35 U.S.C. 154(b) by 231 days.

(21) Appl. No.: 18/744,600

(22) Filed: Jun. 15, 2024

(65) Prior Publication Data

US 2024/0334945 A1 Oct. 10, 2024

Related U.S. Application Data

(63) Continuation of application No. PCT/CN2023/079484, filed on Mar. 3, 2023.

(30) Foreign Application Priority Data

Oct. 14, 2022 (CN) ........................ 202211262296.5

(51) Int. Cl.

*A23C 11/10* (2021.01)
*A23B 2/40* (2025.01)

(Continued)

(52) U.S. Cl.

CPC .............. *A23C 11/103* (2013.01); *A23B 2/40* (2025.01); *A23L 5/34* (2016.08); *A23L 25/40* (2016.08)

(58) Field of Classification Search

CPC ..... A23L 5/25; A23L 5/00; A23L 5/34; A23L 25/40; A23L 25/00; A23J 1/14; A23C 11/103; A23C 19/0328

(Continued)

(56) References Cited

FOREIGN PATENT DOCUMENTS

| | | | | |
|---|---|---|---|---|
| CN | 105918610 Y | | 9/2016 | |
| CN | 106857868 A | * | 6/2017 | ........... A23C 11/103 |

(Continued)

OTHER PUBLICATIONS

Minevich, RU-2333656, Machine Translation English, Sep. 20, 2008, pp. 1-5. (Year: 2008).*

Tang et al. CN106857868, Machine Translation English, Jun. 20, 2017, pp. 1-8 (Year: 2017).*

Deng, Qian-chun et al. CN-113785881, Machine Translation English, Dec. 14, 2021, pp. 1-14 (Year: 2021).*

(Continued)

*Primary Examiner* — Hong T Yoo

(74) *Attorney, Agent, or Firm* — Hemisphere Law, PLLC

(57) ABSTRACT

A preparation method and application of flaxseed plant milk with a good flavor, self-stabilization and functional activity based on interface contro is disclosed. The preparation method includes the following steps: (1) pretreating flaxseed by degumming, microwave cooking and soaking for softening in sequence for standby; (2) performing colloid grinding, enzymatic hydrolysis and slag removal on the flaxseed obtained by soaking for softening in sequence, to obtain flaxseed plant milk A; and (3) performing first high-pressure homogenization, enzyme inactivation, sterilization, and second high-pressure homogenization on the flaxseed plant (Continued)

milk A in sequence, to obtain stable flaxseed plant milk in long-term storage with a good flavor and functional activity based on interface control. The process of the present invention is green, and can maintain stability of a product without adding an exogenous additive. The prepared stable flaxseed plant milk in long-term storage is safe, nutritious, delicious, and suitable for popularization and application.

5 Claims, 26 Drawing Sheets

(51) Int. Cl.
*A23L 5/30* (2016.01)
*A23L 25/00* (2016.01)

(58) Field of Classification Search
USPC ........................................ 426/590, 598, 629
See application file for complete search history.

(56) References Cited

FOREIGN PATENT DOCUMENTS

| | | | | | |
|---|---|---|---|---|---|
| CN | 108308585 | Y | | 7/2018 | |
| CN | 111000189 | A | | 4/2020 | |
| CN | 113785881 | A | * | 12/2021 | ........... A23C 11/103 |
| CN | 113785881 | Y | | 12/2021 | |
| CN | 115553341 | P | | 1/2023 | |
| RU | 2333656 | C1 | * | 9/2008 | ............. A23C 11/00 |

OTHER PUBLICATIONS

CNIPA, First Office Action for Chinese application CN202211262296.5, Nov. 1, 2023.

CNIPA, Notification to grant patent right for Chinese application CN202211262296.5, Feb. 26, 2024.

ISR of PCT/CN2023/079484.

* cited by examiner

FLAXSEED PLANT MILK WITH GOOD FLAVOR, SELF-STABILIZATION AND FUNCTIONAL ACTIVITY BASED ON INTERFACE CONTROL AND PREPARATION METHOD AND APPLICATION THEREOF

TECHNICAL FIELD

The present invention belongs to the technical field of food, and particularly relates to a flaxseed plant milk with a good flavor, self-stabilization and functional activity based on interface control and a preparation method and application thereof.

BACKGROUND

"Health and sustainability" are main driving factors for development of the food industry in China and abroad. Plant milk has many favorable factors in terms of safety, nutrition, humanity, carbon emissions, etc., and has a huge market size and industrial development potential. Traditional first-generation plant milk beverages, such as soymilk, take protein supplementation as a first demand; and second-generation plant milk, such as oat milk, focuses on a unique flavor of the plant milk and promotion of a certain nutritional efficacy such as dietary fiber supplementation. In the future, the plant milk will be bound to be subdivided and developed toward a trend of having a high nutritional value and meeting the market demands of nutrition and application scenarios of different people. In recent years, the flaxseed plant milk has gradually attracted the attention of consumers because it is suitable for different populations, and has comprehensive nutrients and a very high nutritional value. Flaxseed is not only rich in α-linolenic acid (ALA, ~59%), which is the only essential polyunsaturated fatty acid in an n-3 series, but also contains dietary fibers such as high-quality plant proteins and flaxseed gum, and bioactive substances such as lignans, phenolic acids, and vitamin E, wherein a methionine content of flaxseed protein (1.86 g/100 g) is about 2 times that of a soybean protein (0.93 g/100 g), and a biological value BV (77.4) of the flaxseed protein is higher than that of the soybean protein (74), close to that of casein (80).

In recent years, the role of dietary intake of the flaxseed rich in multiple nutrients in improving obesity, diabetes, cardiovascular diseases, inflammatory bowel diseases, tumor diseases, neurodegenerative diseases, etc. is gradually being confirmed. Use of flaxseed whole seeds to prepare the plant milk beverages can not only meet the needs of people for healthy life, but also promote development of related industries and markets to a certain degree. However, at present, a current domestic flaxseed milk processing technology takes shelled flaxseed kernels (paste) as a raw material, which results in that 1) flaxseed shelling results in a low flaxseed kernel yield, high cost, and large energy and raw material losses; 2) a utilization rate of nutritional components in the flaxseed is not high, and nutrients such as flaxseed gum, flaxseed lignans, total phenols, dietary fibers, etc. in flaxseed skin are lost; 3) flaxseed cooking uses baking at a high temperature, which is low in thermal efficiency, and is combined with a paste grinding process, which results in that an oil body with a natural emulsified structure is destroyed; oil and water are separated; ALA is very easily oxidized to produce fishy odor with a poor flavor; and a toxic and harmful oxidation product may be produced; 4) a milking process requires a large amount of emulsifier to emulsify oil sauce, which further leads to an increased cost and is not conducive to properties of a clean label; and 5) a milk system lacks natural antioxidants, needs exogenous addition, and has a short shelf life. Therefore, how to innovate a preparation method of flaxseed plant milk with a good flavor, self-stabilization and functional activity based on an interface control technology is an urgent problem to be solved in the art. Based on this, the present invention breaks through the key technical bottlenecks of full-value and high-value processing of the flaxseed, such as precision degumming, detoxification, aroma production, wall breaking, and efficiency enhancement. A technology of coupling dry precision degumming to low-consumption microwave treatment and biological enzymatic hydrolysis controls physical and chemical self-stability of oil droplets of the plant milk, changes particle size distribution and charge distribution on surfaces of the droplets, significantly reduces grassy flavor substances, and provides baking, coffee, and cocoa aromas to the flaxseed plant milk at the same time based on the interface control technology. This method is green, energy-saving, and water-saving. It significantly improves nutrition (the content of the nutrients), stability (particle size, zeta-potential, and storage stability), and health attributes (evaluation on bioavailability of the ALA, and functional activity) of the flaxseed plant milk, and ensures the properties of the clean label of the plant milk (without use of the exogenous additive). The obtained product has a significant effect of enhancing the immune function.

SUMMARY

In view of this, the present invention provides flaxseed plant milk with a good flavor, self-stabilization and functional activity based on interface control, and a preparation method and application of the self-stabilized flaxseed plant milk. In the present invention, based on an interface control principle, first, stability and fluidity of a plant milk system are quantitatively controlled by means of automatic dry precision degumming, which not only saves energy consumption, but also avoids wastes of water resources and human resources caused by washing and degumming; and softening microwave conditioning efficiently removes cyanogenic glycosides, further directly improves stability of the interface of oil droplets of plant milk and the content of various nutrients in the system based on interface control, and greatly promotes a flavor and a nutritional health activity of the plant milk at the same time. The process of the present invention is green, and can maintain long-term storage stability of a product without adding an exogenous additive. Meanwhile, it is found through an animal experiment that the plant milk developed by the technology of the present invention has obvious functional advantages in improving an intestinal microecological function and an immune test function compared with other commercially available plant milk; and the prepared stable flaxseed plant milk in long-term storage is safe, nutritious and delicious, and is suitable for popularization and application.

In order to achieve the above purpose, the present invention uses the following technical solution:

A preparation method of flaxseed plant milk with a good flavor, self-stabilization and functional activity based on interface control specifically includes the following steps:

(1) pretreating flaxseed by degumming, microwave cooking and soaking for softening in sequence for standby;

(2) performing colloid grinding, enzymatic hydrolysis and slag removal on the flaxseed obtained by soaking for softening in sequence, to obtain flaxseed plant milk A;

(3) performing first high-pressure homogenization, enzyme inactivation, sterilization, and second high-pressure homogenization on the flaxseed plant milk A in sequence, to obtain the stable flaxseed plant milk in long-term storage with the good flavor and functional activity based on interface control.

The present invention uses microwave, biological enzymatic hydrolysis, homogenization after sterilization and other procedures without adding the exogenous additive, which can enrich α-linolenic acid, proteins, lignans and total phenols in the flaxseed plant milk while saving energy and protecting the environment. A commercial sterile condition can meet a shelf life of a plant milk product. Meanwhile, the technology of the present invention can be extended to processing of a variety of flaxseed-based plant milk such as flaxseed-sesame plant milk, flaxseed-*Cannabis sativa* L. seed plant milk, flaxseed-peanut plant milk, flaxseed-soybean plant milk and other plant milk, which can meet the needs of different consumer groups on providing the flaxseed plant milk with the good flavor, self-stabilization and functional activity based on interface control, which is capable of promoting health and supplementing nutrition.

Preferably, the degumming in step (1) uses dry degumming.

During preparation of the stable flaxseed plant milk in long-term storage of the present invention, raw flaxseed is first treated by dry degumming, which can avoid excessive viscosity, low fluidity of plant milk system due to too much flaxseed gum. Meanwhile, flaxseed gum powder as a by-product can be used for extracting and preparing flaxseed gum, flaxseed oligosaccharides, flaxseed lignans, etc.

Conditions of microwave cooking are as follows: a microwave temperature is 115-145° C., a microwave time is 3-12 min, and a water control range of the flaxseed is 8-20%.

A solid-liquid mass ratio for the soaking for softening is 1:(5-10), and a soaking time is 2-24 h.

For the present invention, by coupling water control to microwave to treat the flaxseed, on the one hand, toxic substances such as cyanogenic glycosides and anti-nutritional factors contained in raw flaxseed can be removed, aroma molecules are produced, and the safety and the nutritional quality of a product are ensured; and on the other hand, dissolution of the nutrients such as the lignans in the process of flaxseed milk production can be improved.

Preferably, a colloid grinding time in step (2) is 10-210 min; and a solid-liquid mass ratio of the flaxseed to the water is 1:(5-10).

Slag removal used is horizontal screw slag removal, and a rotating speed is 2500-3000 rpm.

Preferably, an enzyme used in enzymatic hydrolysis in step (2) is any one of cellulase, glucoamylase, protease, pectase, and phytase.

Preferably, in step (2), for enzymatic hydrolysis, a temperature is 45-55° C., a time is 30-120 min, and an addition amount is 0.01-2%.

A seed coat of the flaxseed itself contains 8 layers of cells, wherein a second layer from the outside to the inside is glial cells. Meanwhile, protein bodies that store the flaxseed proteins and oil bodies that store oil are limited in plant cell walls. The present invention can effectively unblock cell structure and promote the dissolution of endogenous proteins, fats, total phenols, the lignans and other nutrients in the flaxseed by soaking for softening, cyclic pulp grinding with a colloid mill coupling biological enzymolysis.

Preferably, in step (3), a pressure for the first high-pressure homogenization is 5-20 MPa; and a pressure for the second high-pressure homogenization is 50-200 bar.

Preferably, in step (3), for enzyme inactivation, a temperature is 90-115° C., and a time is 15-300 s.

Sterilization uses UHT sterilization at a temperature of 135-140° C. for 8-30 s.

The flaxseed itself is rich in the proteins and flaxseed gum polysaccharides, and can be used as an emulsion stabilizer. Therefore, by coupling ultra-high temperature sterilization to homogenization after sterilization, the present invention can achieve a commercial sterile effect of the flaxseed plant milk without adding an additional exogenous emulsifier and stabilizer, and can be stored at a room temperature for a long time to meet the shelf life requirements of the commercially available plant milk.

Preferably, the preparation method further includes sterilely filling the stable flaxseed plant milk in long-term storage with the good flavor and functional activity, wherein a filling temperature is 25-40° C.; and filling includes any one of filling with a paper bag, a PET bottle, a glass can and an aluminum can.

A flaxseed plant milk with a good flavor, self-stabilization and functional activity based on interface control obtained by the above-mentioned preparation method is provided.

Application of the above-mentioned flaxseed plant milk in food processing is provided.

It can be seen from the above technical solution that compared with the prior art, the present invention has the beneficial effects:

1. The present invention uses the steps of dry degumming, microwave, cyclic pulp grinding, biological enzymolysis, sterile homogenization, etc. in cooperation to prepare commercial sterile flaxseed plant milk, which can achieve no deterioration of the quality of the plant milk basically after it is stored at the room temperature for 6 months. The obtained flaxseed plant milk has a content of the proteins of up to 1.6 g/100 g, a content of flaxseed oil of up to 3.5 g/100 g, a content of ALA of up to 1.9 g/100 g, a content of the total phenols of up to 674 mg/100 g, and a content of the lignans of up to 176 mg/100 g. Compared with the commercially available flaxseed plant milk, the commercial sterile flaxseed plant milk has significant advantages in the contents of the nutrients and a clean label.

2. Compared with a conventional technology, the present invention does not need to use any additive, has low energy consumption and water consumption, and is obviously reduced in production cost, belonging to a novel green processing technology. Meanwhile, the flavor of the plant milk is greatly improved, and contents of pyrazine compounds and furan compounds are increased, which suggests that the flavor is gradually changed from a grassy flavor to a roasted flavor and a milk aroma. Moreover, the self-stability of the plant milk is high, a product has a particle size of 3.81 μm, and a zeta-potential of −21.4 mV. Results of accelerated oxidation at 37° C. show that the plant milk is still maintained at high stability within 6 months.

3. Results of an animal experiment show that after intake of the flaxseed plant milk prepared by the technology provided by the present invention, a proportion of DHA in jejunal tissues of a rat is increased continuously, and significantly larger than that of flaxseed milk in a control group; and meanwhile, compared with oat milk and soybean milk control groups, the flaxseed milk prepared by the technology of the present invention has a significant effect of repairing an animal colon tissue injury, and can promote abundance of a Parabacteroides genus in an antibiotic mouse model. Experimental results of animal immunity show that a flaxseed plant milk low dose group prepared by the technology of the present invention can enhance DNFB-induced delayed type hypersensitivity (DTH) in a mouse, with an increase of 27.4%, which is 31.3% higher than that of the oat milk. Compared with a negative control group, a flaxseed plant milk high dose group can enhance a proliferation ability of spleen lymphocytes induced by ConA in the mouse by 21.6%. Compared with the negative control group, the soybean milk and the oat milk, a viability of NK cells in the mouse is enhanced by 19.6%, 10% and 12.2% respectively, and the functional activity of the flaxseed plant milk is significant.

DESCRIPTION OF DRAWINGS

To more clearly describe the technical solutions in the embodiments of the present invention or in the prior art, the drawings required to be used in the description of the embodiments or the prior art will be simply presented below. The drawings in the description are merely embodiments of the present invention.

DETAILED DESCRIPTION

Figure 1:
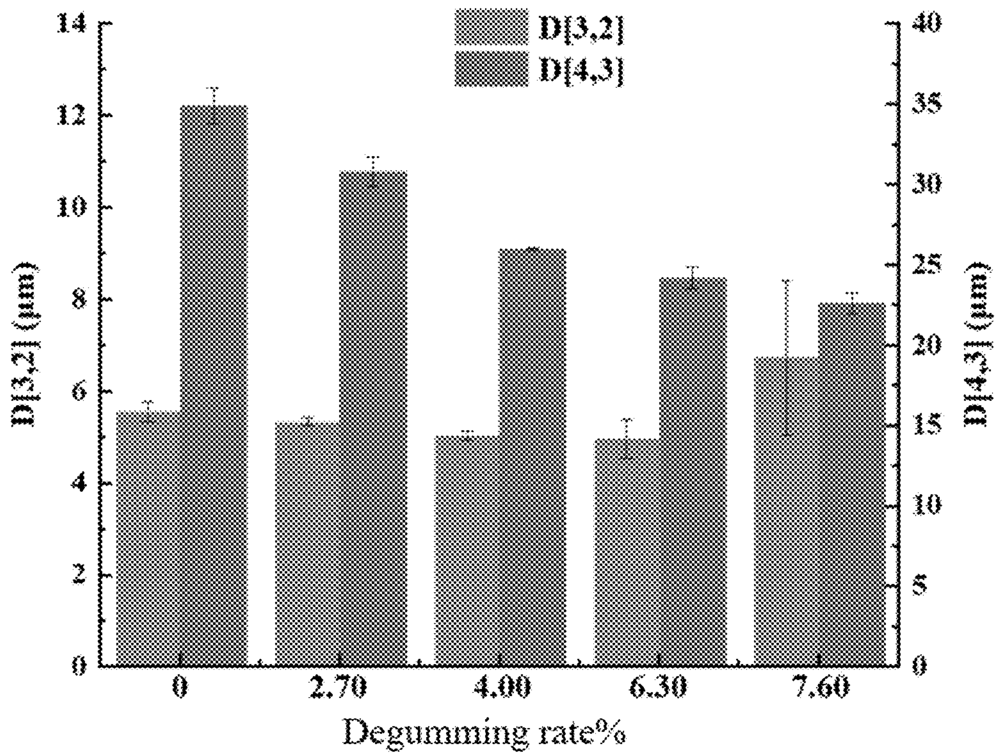
FIG. 1 is a diagram showing particle size distribution of flaxseed plant milk with different degumming rates according to the present invention.

The technical solutions in embodiments of the present invention will be clearly and fully described below. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Embodiment 1

A preparation method of stable flaxseed plant milk in long-term storage with a good flavor and functional activity based on interface control specifically includes the following steps:

(1) cleaning flaxseed, and then pretreating the flaxseed by degumming, microwave cooking and soaking for softening in sequence for standby, wherein degumming of the flaxseed uses dry degumming with a degumming rate of 7.6%; for microwave cooking, a water control range of the flaxseed is 20%, a microwave temperature is 145° C., and a microwave time is 8 min; and during soaking, a solid-liquid mass ratio is 1:7, and a soaking time is 2 h;

(2) performing colloid grinding, enzymatic hydrolysis and slag removal on the flaxseed obtained by soaking for softening in sequence, to obtain flaxseed plant milk A, wherein a colloid grinding time is 90 min, and a solid-liquid mass ratio of the flaxseed to water is 1:9; an enzyme used in enzymatic hydrolysis is cellulase; for enzymatic hydrolysis, a temperature is 50° C., a time is 60 min, and an addition amount is 0.5 wt %; and slag removal used is horizontal screw slag removal, and a rotating speed is 2770 rpm;

(3) performing first high-pressure homogenization, enzyme inactivation, sterilization, and second high-pressure homogenization on the flaxseed plant milk A in sequence, to obtain stable flaxseed plant milk in long-term storage with the good flavor and functional activity based on interface control, wherein a pressure for first high-pressure homogenization is 5 MPa; for enzyme inactivation, a temperature is 90° C., and a time is 15 s; sterilization uses UHT sterilization at a temperature of 135° C. for 8 s; a pressure for second high-pressure homogenization is 50 bar; the flaxseed plant milk has a particle size of 3 μm and a zeta-potential of −20 mV, and contains 1.6 g/100 g of proteins and 1.9 g/100 g of ALA.

Condition Exploration Experiment

I. Degumming Pretreatment on Flaxseed

Outer skin of the flaxseed is rich in flaxseed gum polysaccharides. During preparation of the plant milk, a viscosity of a system may be too large, and dissolution of endogenous proteins in the flaxseed may be further affected. In addition, too much flaxseed gum may also cause flocculation of the flaxseed plant milk, which results in an increased particle size and instability. Therefore, through the dry degumming process, flaxseed gum powder as a by-product is obtained while the above problems are solved. Flaxseed gum powder can be used for preparing flaxseed gum as a food additive, flaxseed lignans with high biological activity, etc., which meets the requirements for full-value processing and utilization.

1. Materials and Reagents

Yellow flaxseed; and other reagents purchased from Sinopharm Chemical Reagent Co., Ltd.

2. Main Instrument and Device

TJFL-18S flaxseed degumming machine; Malvern 3000 laser particle size analyzer-Malvern Instruments, UK; and SNB-1 digital viscometer from Shanghai Hengping Instrument.

3. Experimental Method and Results (1) Sample preparation: fresh, dry and non-decayed or rot flaxseed is selected, and the flaxseed is degummed with a dry degumming device with degumming rates of 0.00%, 2.70%, 4.00%, 6.30% and 7.60%; microwave cooking uses a closed microwave digestion system (a closed microwave rapid extraction system) at a power of 720 W for 6 min to obtain microwave cooked flaxseed; and each group of cooked and dry degummed flaxseed is soaked into pure water at a room temperature for 2 h according to a solid-liquid mass ratio of 1:7, and pulp grinding is performed for 3 min to obtain the flaxseed plant milk.

(2) Particle size distribution of the flaxseed plant milk in each group is determined by a laser particle size analyzer by means of a laser diffraction technology. Results are shown in FIG. 1, wherein D [3, 2] is a surface area momentum average diameter, and D [4, 3] is a volume or mass momentum average diameter. Parameters are measured: a wet dispersion method is used for analysis to obtain that a refractive index of a sample is 1.480, a refractive index of the water is 1.330, a stirring rate is 2000 rpm/min, and a test temperature is 25° C. Results are shown in FIG. 1.

As shown in FIG. 1, with the increase of the dry grinding degree of the flaxseed, the particle size of the flaxseed plant milk shows a downward trend, which indicates that after dry degumming, a size of oil droplets in the flaxseed plant milk is decreased, to facilitate system stability.

(3) Measurement on the viscosity of the flaxseed plant milk: 30 mL of the flaxseed plant milk is put in a 50 mL flat-bottom centrifuge tube; a digital viscometer and a rotor No. 3 are used; a rotating speed is set at 60 rpm; and a viscosity is recorded. Results are shown in Table 1.

(4) A content of the proteins in the flaxseed plant milk is measured according to a first method in GB 5009.5-2016. Results are shown in Table 1.

TABLE 1

Results of Detection on Flaxseed Plant Milk with Different Degumming Rates

| Degumming rate/% | Viscosity/mPa · s | Content of proteins g/100 g |
|---|---|---|
| 0.00% | 763.55 ± 22.46 | 1.75 ± 0.08b |
| 2.70% | 787.35 ± 44.79 | 2.02 ± 0.12ab |
| 4.00% | 751.63 ± 24.89 | 2.10 ± 0.12a |
| 6.30% | 665.00 ± 32.51 | 2.14 ± 0.12a |
| 7.60% | 603.28 ± 30.90 | 2.07 ± 0.08a |

From data in Table 1, it can be seen that dry degumming can effectively reduce the viscosity of the plant milk; and dry degumming can effectively increase the content of the proteins in the flaxseed plant milk, which indicates that dry degumming promotes dissolution of the proteins during pulping.

II. Microwave Treatment on Flaxseed Based on Interface Control

The flaxseed is added to a reactor; steam is introduced for full mixing for different times; then the flaxseed is taken out; and a steam intake quantity and a stirring time are adjusted to obtain different gradients of water contents of the flaxseed, wherein the gradients are from 11% to 23%. As a kind of ultra-high frequency electromagnetic waves, the microwave promotes high-frequency reciprocating motion of dipole molecules to produce "internal friction heat" which may be absorbed by foods, water and the like to make themselves heat. It can achieve simultaneous heating and simultaneous temperature raising without a heat conduction process. Heating is fast and uniform, and an energy consumption isa fraction or several tenths of that of traditional heating. It can also achieve 1) detoxification of the flaxseed, 2) aroma enhancement with a Maillard reaction, and 3) passivation of endogenous oxidase, which changes a structure of a cell wall, and promotes depolymerization of macromolecular lignans and dissolution of polyphenols, thereby achieving quality improvement. Through analysis from the microscopic angle, after microwave treatment, an interface structure and an interface composition (including phospholipids, proteins, etc.) of the oil body in the flaxseed are changed; meanwhile, the microwave promotes phenolic substances to migrate into the interface, which effectively improves chemical stability of the oil body in the flaxseed, and promotes the bioavailability of ALA during digestion.

1. Materials and Reagents

Yellow flaxseed; and other reagents purchased from Sinopharm Chemical Reagent Co., Ltd.

2. Main Instrument and Device

Flaxseed degumming machine; Malvern 3000 laser particle size analyzer-Malvern Instruments, UK; and SNB-1 digital viscometer from Shanghai Hengping Instrument.

3. Experimental Method and Results (1) Sample preparation: the degummed flaxseed is selected, and added to the reactor, the steam is introduced for full stirring for different times, and then the flaxseed is taken out; the steam intake quantity and the stirring time are adjusted to obtain different gradients (11%-20%) of water contents of the flaxseed, wherein the gradients are from 11% to 23%; the flaxseed is subjected to microwave treatment at a power of 720 W for 9 min to obtain microwave cooked flaxseed; each group of the cooked and dry degummed flaxseed is soaked into the pure water at the room temperature for 2 h according to a solid-liquid mass ratio of 1:7; and the flaxseed is subjected to cyclic pulp grinding with a colloid mill for 12 min to obtain the flaxseed plant milk.

Figure 2:
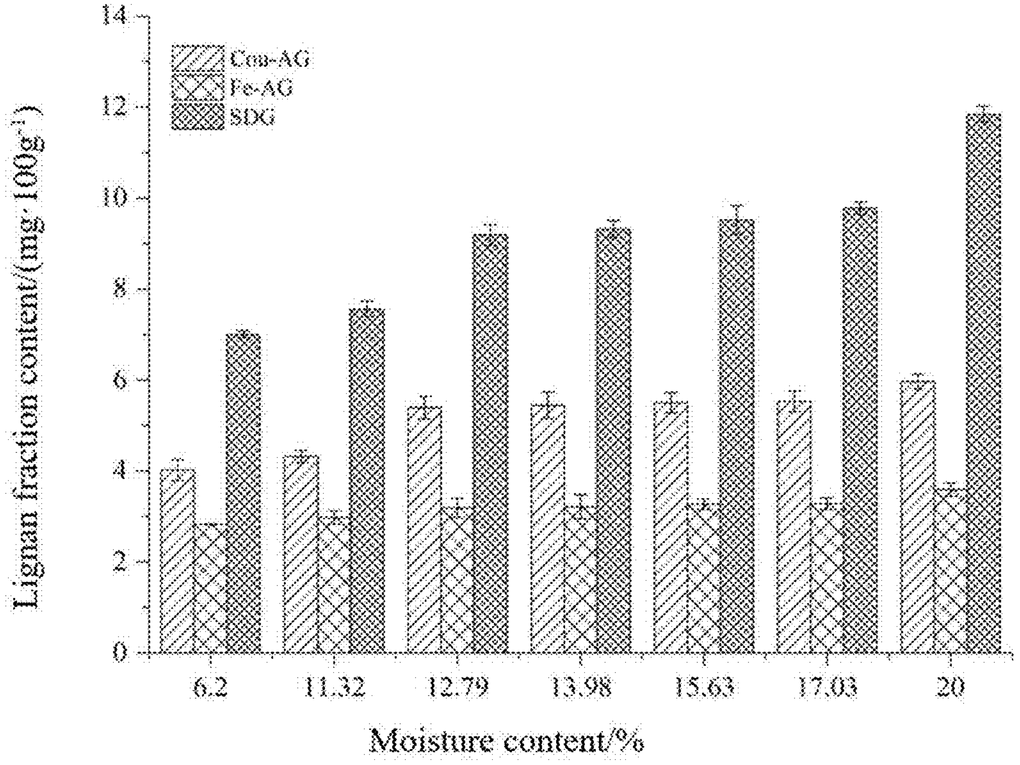
FIG. 2 is a diagram of contents of various lignans in flaxseed plant milk with different water contents according to the present invention.

(2) A content of a lignan component of the flaxseed plant milk: 1.5 g of a flaxseed plant milk sample is weighed, and added to 8 mL of a 80% (v/v) methanol aqueous solution; a mixture is ultrasonically extracted for 30 min, then extracted by oscillation for 30 min, and centrifuged at 5000 rpm for 10 min; a supernatant is collected; 5 mL of the supernatant is sucked with NaOH added therein, to make its final concentration be 20 mmol/L; a resultant is subjected to alkaline hydrolysis with oscillation in a water bath at 50° C. for 12 h; then HCl is added to neutralize a resultant to pH value of 6.8; a resultant is filtered a with 0.22 μm filter head, then charged into a sampling vial; contents of SDG, CouAG, and FeAG in the flaxseed are analyzed by an Agilent 1290 ultra performance liquid chromatograph (UPLC) equipped with a PDA detector. Results are shown in FIG. 2. Chromatographic conditions: an RP18 chromatographic column (100 mm×2.1 mm, 1.7 μm); a mobile phase A, 100% methanol; a mobile phase B, 0.5% acetic acid aqueous solution; a flow rate is 0.10 mL/min; a detector wavelength is 280 nm, and an injection volume is 2 μL; and a flow rate is 0.1 mL/min. Gradient elution conditions: 15% A, 0-8 min; 15-28% A, 8-12 min; 28-55% A, 16-24 min; 55-85% A, 24-28 min; 85-15% A, 32-33 min; and 15% A, 33-35 min.

It can be seen from FIG. 2 that with the increase of the water control degree of the flaxseed, SDG and Cou-AG components in the flaxseed plant milk show an increasing trend. It is indicated that water control promotes dissolution and depolymerization of the lignans in the flaxseed plant milk.

Figure 3:
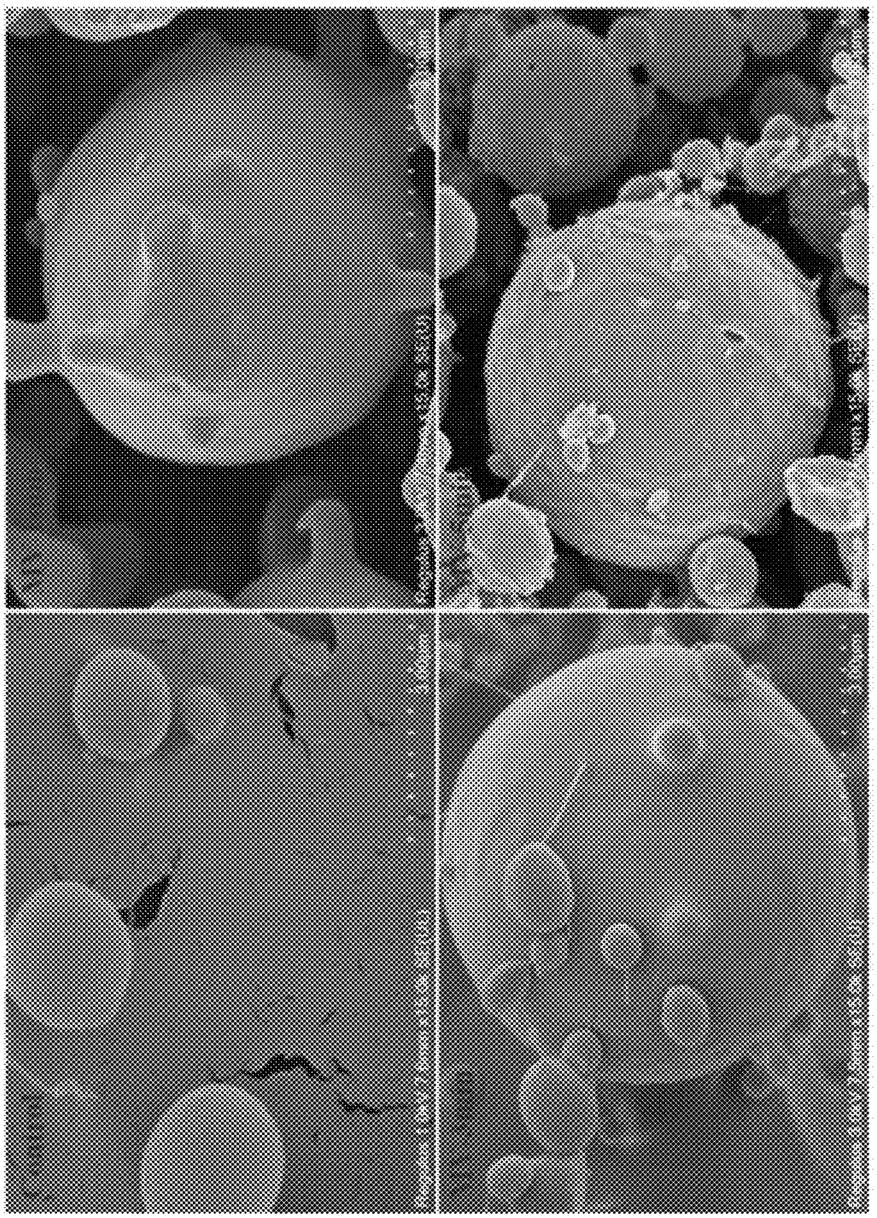
FIG. 3 is a diagram showing control of microwave on appearance of an interface of an oil body in flaxseed plant milk according to the present invention.

(3) Effect of microwave on interface control: the flaxseed with the water content adjusted to 20% is used, and subjected to microwave treatment at the power of 700 W for 1-5 min to obtain the microwave cooked flaxseed; the microwave cooked flaxseed is soaked into the pure water at a solid-liquid mass ratio of 1:10 for 2 h at the room temperature; a resultant is subjected to cyclic pulp grinding with a shearing mill for 3 min to obtain the flaxseed plant milk; the flaxseed plant milk is filtered with a 120-mesh filter bag, centrifuged at a rotating speed of 10000 g and 4° C. for 30 min; and flaxseed oil body layer at an upper layer is taken as an interface analysis material. A microstructure of the oil body in the flaxseed is characterized by a low temperature preparation system in combination with a high-resolution field emission scanning electron microscope. Results are shown in FIG. 3. It can be seen from FIG. 3 that before microwave treatment, the interface of the oil body in the flaxseed is smooth; after microwave treatment, the interface structure of the oil body in the flaxseed is changed obviously; and surface roughness indicates that the interface composition is changed.

Particle size distribution of the oil bodies in the flaxseed is determined by the laser particle size analyzer by means of the laser diffraction technology. Parameters are measured: a wet dispersion method is used for analysis to obtain that a refractive index of a sample is 1.480, a refractive index of the water is 1.330, a stirring rate is 2000 rpm/min, and a test temperature is 25° C. Results are shown in FIG. 4A. An emulsion is diluted with deionized water at a ratio of 1:250, and ζ zeta-potentials of the emulsion under different enzymatic hydrolysis conditions are measured by using a Malvern nanoparticle size analyzer. Results are shown in FIG. 4B.

Figure 4:
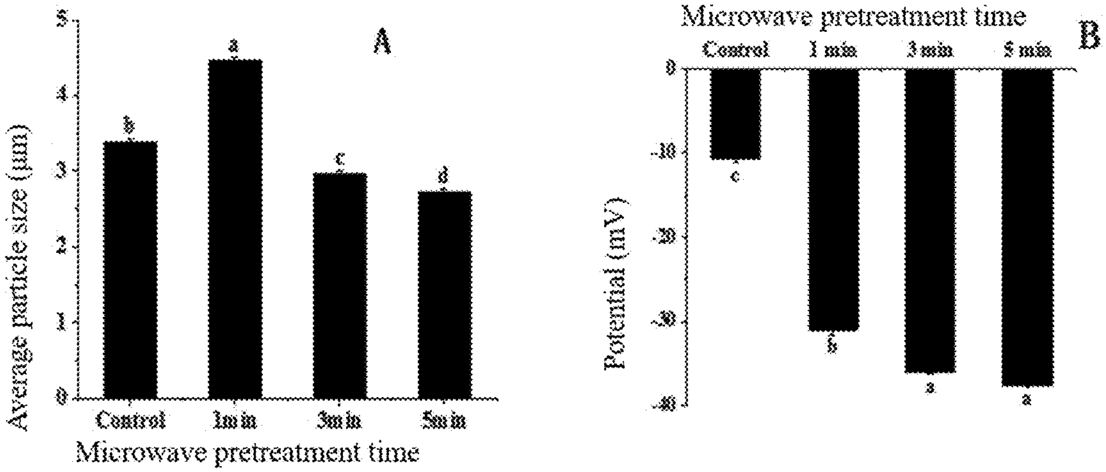
FIG. 4 is a diagram showing control of microwave on a particle size and a zeta-potential of an oil body in flaxseed plant milk according to the present invention.

It can be seen from FIG. 4 that with the prolonging of the microwave time, the particle size of the oil body is increased first and then decreased, and the zeta-potential is gradually increased, which further confirms that the microwave controls the interface of the oil body.

Figure 5:
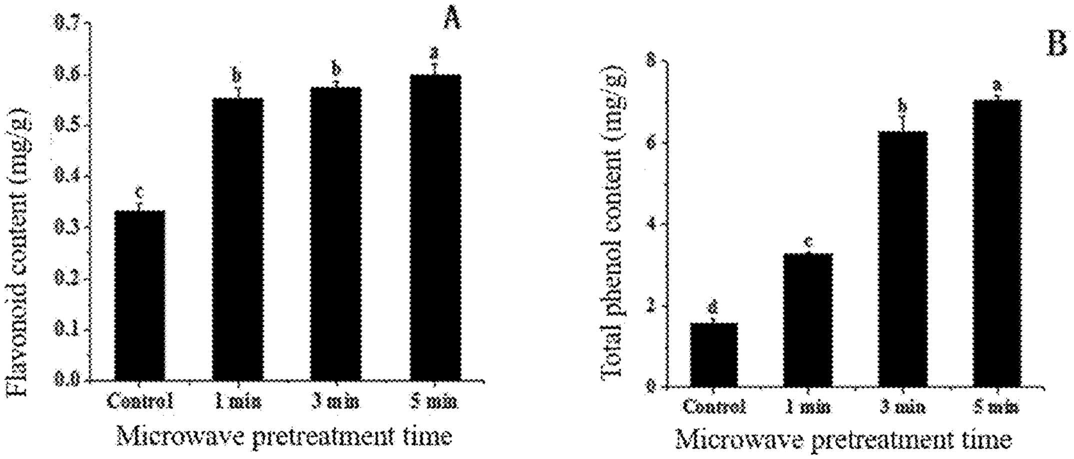
FIG. 5 is a diagram showing control of microwave on total phenols and flavonoids of an oil body in flaxseed plant milk according to the present invention.

The total phenols and the flavonoids are measured by Folin-Ciocalteu method and an aluminum nitrate measurement method respectively. Results are shown in FIG. 5. FIG. 5A is a control diagram of the flavonoids; and FIG. 5B is a diagram of control on the total phenols in the oil body. The contents of the total phenols and the flavonoids in the oil body are increased with the prolonging of the microwave time. It is suggested that the microwave promotes antioxidant molecules in the plant milk system to migrate to the interface, which shows promotion on the chemical stability of the plant milk.

(4) Microwave interface control promotes the bioavailability of the ALA in the flaxseed milk.

The flaxseed with the water content controlled at 20% is treated with the microwave at the power of 700 W for 1-5 min to obtain the microwave cooked flaxseed; after microwave treatment, the flaxseed is soaked into the pure water at the room temperature for 2 h according to the solid-liquid mass ratio of 1:10; a resultant is subjected to cyclic pulp grinding with a shearing mill for 3 min to obtain the flaxseed plant milk; and then the flaxseed plant milk is filtered with a 200-mesh filter bag for later use in an animal experiment.

Male SD rats (weighed 220-250 g) are from Fuhe Biotechnology Co., LTD. (Shanghai, China). After one week of adaptive feeding in an environment with controlled temperature and humidity and 12 h light-dark cycle, the rats are randomly divided into 4 groups, with 15 rats in each group. After fasting for one night, 5 rats in each group are given 2.5 mL of the flaxseed milk intragastrically. The rats are sacrificed at 1, 2 and 4 h after intragastric administration, and intestinal tissues are collected for quick freezing with liquid nitrogen. Collected specimens are immediately stored at −80° C. until analysis. Jejunal tissues are dispersed into precooled saline at a ratio of 1:9 (w/v) by high-speed shearing. Total lipids are extracted with chloroform-methanol (2:1, v/v), and centrifuged at 10000 rpm for 10 min; and a chloroform layer of a supernatant is taken, and dried with nitrogen. Fatty acid methyl ester is prepared, and analyzed by Agilent 6890 GC with a flame ionization detector (FID) and a silica capillary column (30 m×0.25 mm, 0.25 μm). A temperature starts from 175° C., maintained for 10 min, then is increased to 250° C. at a rate of 1° C./min. Temperatures of an injector and the detector are set at 250° C. Helium is used as carrier gas at a flow rate of 1.5 mL/min. An injection volume is 2 μL, and a split ratio is 10:1. The temperatures of the injector and the detector are set at 250° C. The fatty acid methyl ester is identified by being compared with a genuine standard (GLC-463), and a relative content is expressed by an area normalization method.

Figure 6:
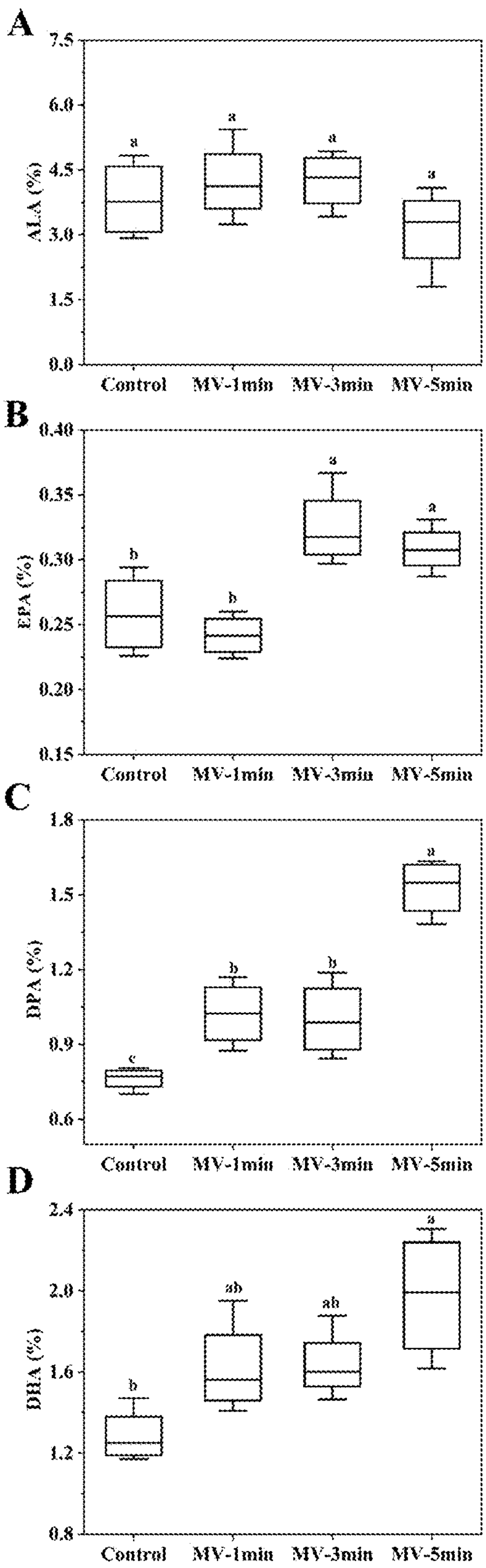
FIG. 6 is a diagram showing control of microwave on bioavailability of ALA in an oil body in flaxseed plant milk according to the present invention.

Distribution of main N-3 polyunsaturated fatty acids in the jejunal tissues of the rats after intake of the flaxseed plant milk is shown in FIG. 6. In FIGS. 6, A, B, C, and D are scale diagrams of the ALA and its transformation products EPA, DPA and DHA in the jejunal tissues after 1 h of intake of the microwave treated flaxseed milk. It can be seen that proportions of the ALA and its transformation products EPA, DPA and DHA in the jejunal tissues reach 3.82%, 0.26%, 0.76%, and 1.29% respectively after 1 h of intake of non-microwave treated flaxseed milk. When the flaxseed is irradiated by the microwave for 1-3 min, the proportions of the ALA and the EPA in the jejunal tissues are increased by 11.24% and 25.90% respectively ($p<0.05$). Subsequently, after microwave irradiation on the flaxseed for 5 min, the proportions of the ALA and the EPA in the jejunal tissues remain unchanged, but after microwave irradiation on the flaxseed for 1-5 min, the proportions of DPA and DHA in the jejunal tissues of the rats show an increase in a same proportion. After 4 h of intake of the flaxseed plant milk, accumulation of the ALA and the EPA in the jejunal tissues of the rats is decreased linearly (−17.42% and −24.38%, $p<0.05$) with the prolonging of a microwave irradiation time (1-5 min). The proportions of the DPA in the jejunal tissues of rats eating the plant milk made from untreated flaxseed and the flaxseed irradiated by the microwave for 1 min tend to be the same; and the proportion of the DPA is increased obviously (+21.27%, and +15.19%, $p<0.05$) when the rats eat the plant milk made from the flaxseed irradiated by the microwave for 3-5 min. It is worth noting that after the rats eat the flaxseed treated with the microwave for 1-5 min, the proportion of the DHA in the jejunal tissues is increased continuously, and then decreased, but it is still larger than that of the rat eating the untreated flaxseed ($p<0.05$). In general, the above experimental results prove that microwave treatment controls the interface of the oil body in the flaxseed plant milk, and promotes the bioavailability of the ALA.

(5) Flavors of Flaxseed Plant Milk Under Different Microwave Times

Headspace solid-phase micro-extraction is used to extract volatile compounds from upper headspace of undigested plant milk, and plant milk enzymatically hydrolyzed with Flavourzyme 500 MG, novo, bromelain solarbio, hemicellulase XS, β-glucanase XS, cellulase CTS novo, and CELLUCLAST 1.5 L novo; and samples are labeled 0-6 in sequence. Types and concentrations of volatiles are measured by using gas chromatography-mass spectrometry (Agilent 7890A-5975C) and a HP-5 MS column (60 m×0.25 mm×0.25 μm, Agilent Technologies, a catalog number of 122-5532). Results are shown in Table 2. An inlet temperature is set at 250° C.; a temperature of an ion source is set at 230° C.; a temperature of the interface is set at 280° C.; and a flow rate of the carrier gas is 1.5 mL/min.

A temperature slope used in the process is as follows: the temperature is maintained at 40° C. for 2 min, heated to 200° C. at 4° C./min, maintained at 200° C. for 2 min, and then heated to 280° C., at 8° C./min; the injection volume is set at 1 μL; a mass spectrometer works in a shock mode of 150° C. and a voltage of 70 eV. A scanning range of the mass spectrometer is 40-400 amu, and solvent delay is for 7 min. Single compounds are identified and quantified by MS-library search (Wiley 138K, John Wiley and Sons, Hewlett Packard, USA). The effect of enzymatic hydrolysis on volatile flavor compounds in the plant milk is analyzed by headspace solid-phase micro-extraction-gas chromatography-mass spectrometry.

It can be seen from Table 2 that the flavor of the flaxseed milk prepared from the flaxseed untreated with the microwave is weak. It mainly shows that with the increase of the water content of the flaxseed, contents of pyrazine compounds and furan compounds are gradually increased, and show a significant upward trend especially after 6 min. The above results show that the microwave can greatly improve aroma molecules of the plant milk, and the flavor.

TABLE 2

Flavors of Milk Prepared from Flaxseed Treated with Microwave at Different Water Contents (μg/kg)

| | Raw seed | 2 min | 4 min | 6 min | 8 min | 10 min |
|---|---|---|---|---|---|---|
| Furans | 5.26 ± 2.31 | 21.26 ± 6.12 | 70.19 ± 10.21 | 80.42 ± 9.76 | 554.45 ± 6.75 | 152.43 ± 10.76 |
| Pyrazines | n.d. | n.d. | n.d. | n.d. | 81.42 ± 3.33 | 68.97 ± 8.93 |
| Aldehydes | 14.45 ± 3.96 | 16.11 ± 5.92 | 18.07 ± 10.22 | 10.91 ± 3.81 | 99.31 ± 10.12 | 19.27 ± 2.13 |
| Ketones | 151.1 ± 32.15 | 207.24 ± 20.63 | 221.74 ± 5.19 | 709.13 ± 20.31 | 2473.56 ± 29.93 | 18.70 ± 9.54 |
| Alcohols | 51.3 ± 10.11 | 83.01 ± 11.23 | 97.10 ± 8.11 | 101.49 ± 6.42 | 538.71 ± 20.82 | 149.58 ± 18.31 |
| Alkenes | 10.12 ± 3.34 | 10.59 ± 8.25 | 1.68 ± 10.35 | 6.66 ± 2.21 | 44.66 ± 5.94 | 65.51 ± 10.52 |

III. Targeted Enzymatic Hydrolysis Treatment on Flaxseed Plant Milk

The targeted enzymatic hydrolysis principle is based on targeted and efficient hydrolysis of glycosidic bonds, peptide bonds, and ester bonds to achieve that: 1) cleavage of cell wall composition fibers such as cellulose, hemicellulose, and pectin is promoted, and efficient dissolution of the endogenous proteins, the polyphenols, and the oil is increased; 2) a molecular weight of macromolecular polysaccharides of the plant is lowered, so that on one hand, dissolution of endogenous dietary fibers is increased, and on the other hand, a viscosity of the system is lowered; and 3) the flavor and a taste of the system, and the emulsion stability are improved.

1. Materials and Reagents

Yellow flaxseed; different enzymes; and other reagents purchased from Sinopharm Chemical Reagent Co., Ltd.

2. Main Instrument and Device

Flaxseed degumming machine; Malvern 3000 laser particle size analyzer-Malvern Instruments, UK; and SNB-1 digital viscometer from Shanghai Hengping Instrument.

3. Experimental Method and Results (1) Sample preparation: after the microwave treated and degummed flaxseed is soaked at 1:7 for 2 h, the pure water is added at a ratio of 1:9, and plant milk is collected after 12 min of cyclic grinding with the colloid mill; and the plant milk is enzymatically hydrolyzed by 0.5 wt % enzyme at 50° C. for 1 h, and then collected, all samples are centrifuged at 2770 rpm for 3 min, and a supernatant is taken to obtain the flaxseed plant milk.

(2) A content of the total solids in the flaxseed plant milk is measured according to GB/T 30885-2014 6.2. Results are shown in Table 7.

Figure 7:
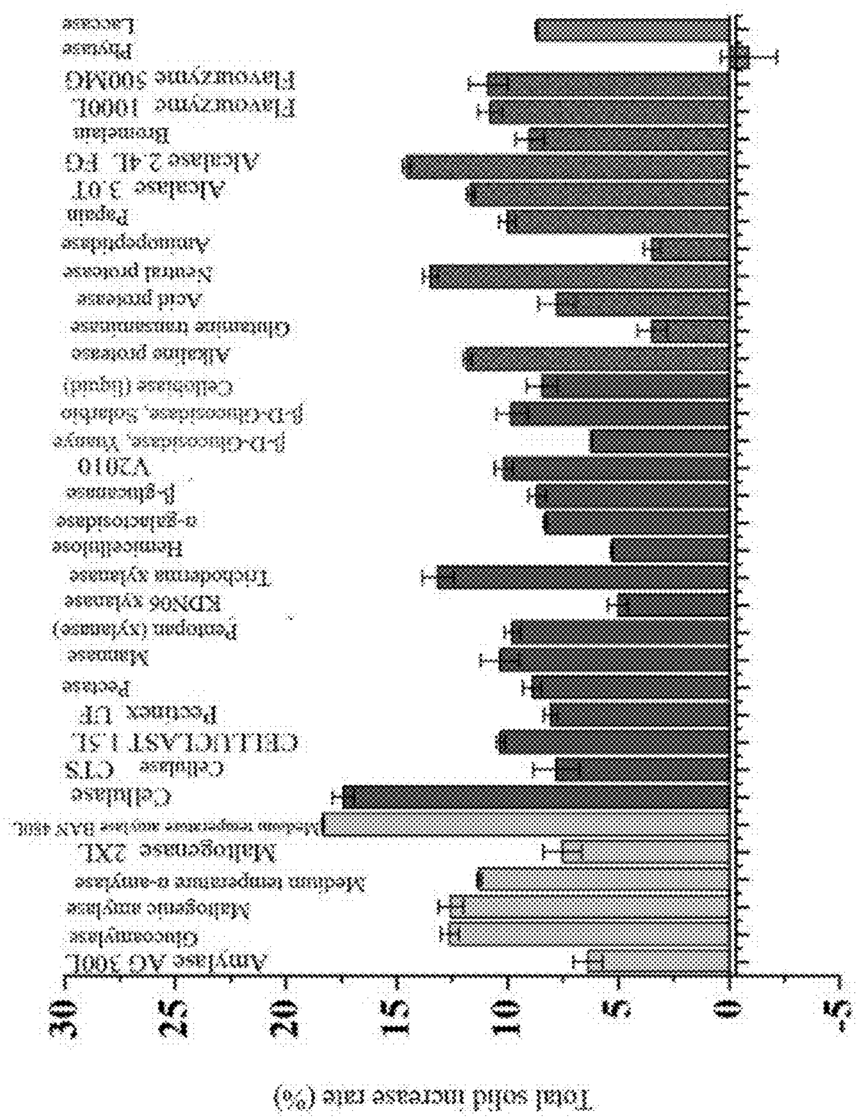
FIG. 7 is a diagram of contents of total solids in flaxseed plant milk subjected to different methods of enzymatic hydrolysis according to the present invention.

It can be seen from FIG. 7 that with the enzymatic hydrolysis of the flaxseed, the content of the solids in the flaxseed plant milk shows different change trends. In general, the protease, the cellulase and cell wall lyases have the most obvious effect on improvement in the solids in the plant milk, and the highest content of the solids may exceed 40%.

(3) Measurement on the viscosity of the flaxseed plant milk: 30 mL of the flaxseed plant milk is put in a 50 mL flat-bottom centrifuge tube; an SNB-1 digital viscometer and a rotor 2 # are used; a rotating speed is set at 60 rpm; and a viscosity is recorded. Results are shown in FIG. 8.

Figure 8:
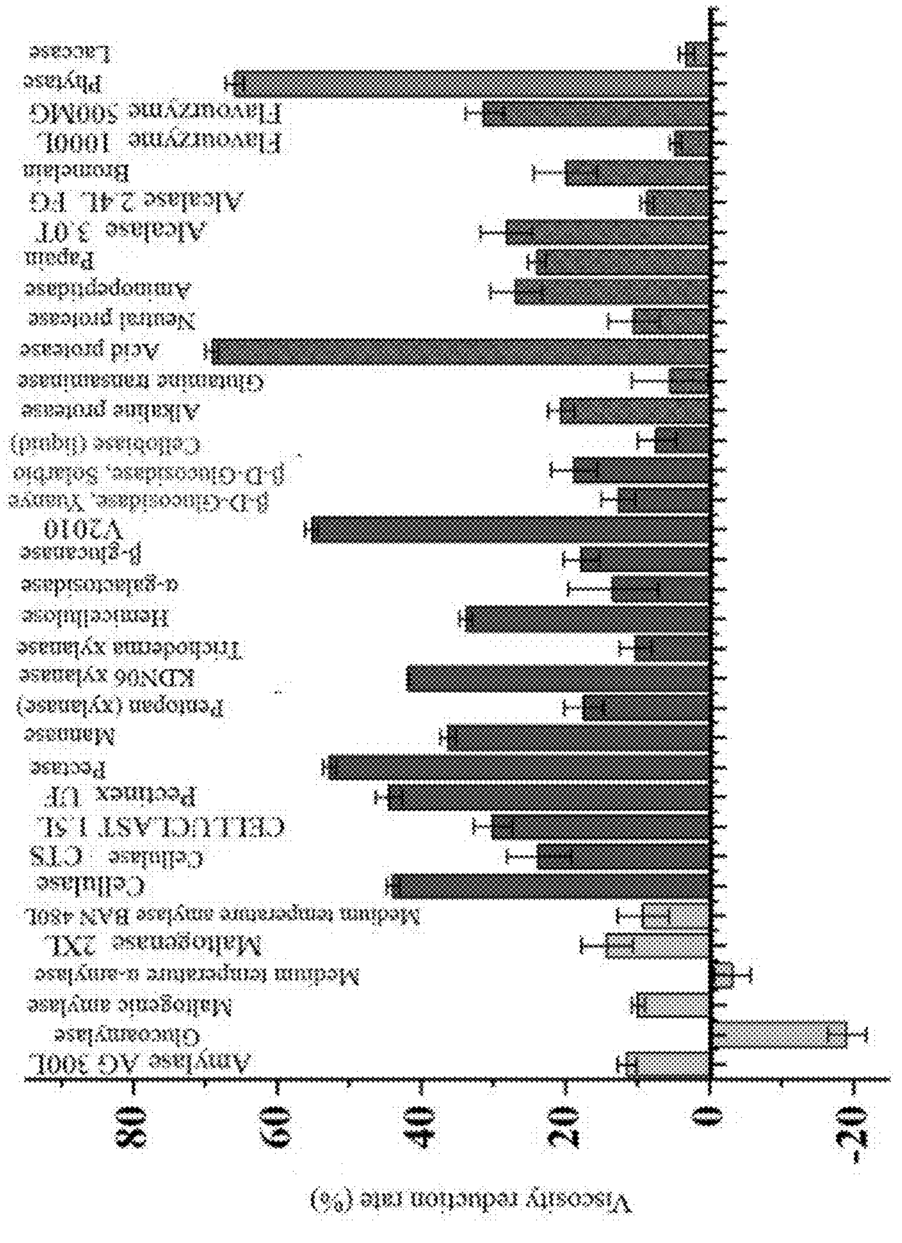
FIG. 8 is a diagram of viscosities of flaxseed plant milk subjected to different methods of enzymatic hydrolysis according to the present invention.

It can be seen from FIG. 8 that with the enzymatic hydrolysis of the flaxseed, the viscosity of the flaxseed plant milk shows different change trends. In general, the cellulase, the cell wall lyases and alkaline protease have the most obvious effect on reducing the viscosity of the plant milk, and can reduce the viscosity by more than 70% highest.

(4) Analysis on Aroma Components in Enzymatically Hydrolyzed Flaxseed Plant Milk Headspace solid-phase micro-extraction is used to extract the volatile compounds from the upper headspace of the undigested plant milk, and the plant milk enzymatically hydrolyzed with the Flavourzyme 500 MG, the novo, the bromelain solarbio, the hemicellulase XS, the β-glucanase XS, the cellulase CTS novo, and the CELLUCLAST 1.5 L novo; and samples are labeled 0-6 in sequence. Types and concentrations of the volatiles are measured by using the gas chromatography-mass spectrometry (Agilent 7890A-5975C) and the HP-5 MS column (60 m×0.25 mm×0.25 μm, Agilent Technologies, the catalog number of 122-5532). The results are shown in Table 2. The inlet temperature is set at 250° C.; the temperature of the ion source is set at 230° C.; the temperature of the interface is set at 280° C.; and the flow rate of the carrier gas is 1.5 mL/min.

The temperature slope used in the process is as follows: the temperature is maintained at 40° C. for 2 min, heated to 200° C. at 4° C./min, maintained at 200° C. for 2 min, and then heated to 280° C., at 8° C./min; the injection volume is set at 1 μL; the mass spectrometer works in the shock mode of 150° C. and the voltage of 70 eV. The scanning range of the mass spectrometer is 40-400 amu, and solvent delay is for 7 min. The single compounds are identified and quantified by MS-library search (Wileyl38K, John Wiley and Sons, Hewlett Packard, USA). The effect of enzymatic hydrolysis on the volatile flavor compounds in the plant milk is analyzed by the headspace solid-phase micro-extraction-gas chromatography-mass spectrometry.

TABLE 3

Results of Effects of Enzymatic Hydrolysis on Flavor of Plant Milk

| Chinese name | CAS | Olfactory | 0 | 1 | 2 | 3 | 4 | 5 | 6 |
|---|---|---|---|---|---|---|---|---|---|
| 2-methyl-2-butene | 000513-35-9 | | | Fresh grassy flavor | | | | | |
| Pentanal | 000110-62-3 | O | Fruity flavor | | Nut flavor | | | | |
| Dimethyl sulfide | 000075-18-3 | O | Roasted cabbage flavor, and creamy corn flavor | | | | | | |
| Acetone | 000067-64-1 | O | Apple flavor | | | | | | |
| 2-methyl-furan | 000534-22-5 | | | | | | | | |
| 3-methyl-furan | 000930-27-8 | | | | | | | | |
| Butyraldehyde | 000123-72-8 | | | | Greenness production | | | | Greenness production |
| 2-butanone | 000078-93-3 | O | Fruity flavor | | Fruity flavor, and camphor ball flavor | | | | |
| 2-ethyl-furan | 003208-16-0 | | | | | | | | |
| 6-aminobenzopyrene | 007428-83-3 | | | | | | Grassy flavor, fruity flavor, and oily flavor | | |

TABLE 3-continued

| Results of Effects of Enzymatic Hydrolysis on Flavor of Plant Milk | | | | | | | | | |
|---|---|---|---|---|---|---|---|---|---|
| Chinese name | CAS | Olfactory | 0 | 1 | 2 | 3 | 4 | 5 | 6 |
| (E,Z)-3,4-dimethyl-2, 4-hexadiene | 002417-88-1 | O | | | | Oily flavor, and greenness production | | Oily flavor, and greenness production | |
| Hexanal | 000066-25-1 | O | Oily flavor, grassy flavor, and fruity flavor | Oily flavor, grassy flavor, and fruity flavor | Grassy flavor, fruity flavor, and oily flavor | | | Grassy flavor, fruity flavor, and oily flavor | Grassy flavor, fruity flavor, and oily flavor |
| 1-penty1-3-alcohol | 000616-25-1 | | | | | | | | |
| 2-methyl-3-heptanone | 013019-20-0 | Internal standard | | | | | | | |
| 2-heptanone | 000110-43-0 | | | | | | Grassy flavor and fruity flavor | | |
| Heptaldehyde | 000111-71-7 | | | | | | | | |
| Ethynylcyclopentan | 054140-30-6 | | | | | | Fruity flavor, grassy flavor and fermented flavor | | |
| 4-methyl-3-penten-2-one | 000141-79-7 | | | | Earthy flavor, and grassy flavor | | | | |
| (E)-2-hexenal | 006728-26-3 | | | | | | | | |
| 2-pentyl-furan | 003777-69-3 | O | | Grassy flavor, and fruity flavor | Grassy flavor, and fruity flavor | Grassy flavor, and fruity flavor | | Grassy flavor, and fruity flavor | Grassy flavor, and fruity flavor |
| 1-pentanol | 000071-41-0 | O | Fruity flavor, grassy flavor, and fermented flavor | Fruity flavor, grassy flavor, and fermented flavor | Fruity flavor, grassy flavor, and fermented flavor | Fruity flavor, grassy flavor, and fermented flavor | | Fruity flavor, grassy flavor, and fermented flavor | Sweet flavor, and oil flavor |
| n-caprylic aldehyde | 000124-13-0 | | | | | | Popcorn sweet flavor, and apple flavor | Citrus flavor, grassy flavor and fatty flavor | |
| (Z)-2-pentenol | 001576-95-0 | O | Grassy flavor, fruity flavor, and metal flavor | Grassy flavor, fruity flavor, and metal flavor | | Grassy flavor, fruity flavor, and metal flavor | | Grassy flavor, fruity flavor, and metal flavor | |
| (E)-2-heptaldehyde | 018829-55-5 | O | | Oily flavor, sweet flavor, and fruity flavor | | Oily flavor, sweet flavor, and fruity flavor | | Oily flavor, sweet flavor, and fruity flavor | |
| 2,5-dimethyl-pyrazine | 000123-32-0 | O | Oily flavor, and baking flavor | | | | | | |
| Hexyl formate | 000629-33-4 | O | | Popcorn sweet | | Popcorn sweet | | Popcorn sweet | Popcorn sweet |

TABLE 3-continued

Results of Effects of Enzymatic Hydrolysis on Flavor of Plant Milk

| Chinese name | CAS | Olfactory | 0 | 1 | 2 | 3 | 4 | 5 | 6 |
|---|---|---|---|---|---|---|---|---|---|
| | | | | flavor, and apple flavor | | flavor, and apple flavor | | flavor, and apple flavor | flavor, and fruity flavor |
| 1-hexanol | 000111-27-3 | O | | | Popcorn sweet flavor, and grassy flavor | | | | Popcorn sweet flavor, and fruity flavor |
| (E)-3-hexene-1-ol | 000928-97-2 | | | Fruity flavor, and grassy flavor | | | | Fruity flavor, and grassy flavor | Fruity flavor, and grassy flavor |
| Nonanal | 000124-19-6 | | | Citrus flavor, and oily flavor | | | | Citrus flavor, and oily flavor | Citrus flavor, and oily flavor |
| (E,E)-2,4-hexadiene | 000142-83-6 | | | Citrus flavor, and fresh grassy flavor | | | Mushroom flavor, and earthy flavor | Citrus flavor, and fresh grassy flavor | Citrus flavor, and fresh grassy flavor |
| (E)-2-hexene-1-ol | 000928-95-0 | | | | | | Musty flavor, grassy flavor, and oily flavor | | Fruity flavor, grassy flavor, and banana flavor |
| 3-octene-2-one | 001669-44-9 | O | Oily flavor, and cream flavor | | | | | | |
| 3,5-octadien-2-ol | 069668-82-2 | | | | | | Oily flavor, and cinnamon flavor | | |
| 3-methyl-2-cyclohexen-1-one | 001193-18-6 | O | | | Nut flavor, and baking flavor | | | | |
| (E)-2-octenal | 002548-87-0 | O | Grassy flavor, and oily flavor | Baking flavor, and oily flavor | Baking flavor, and oily flavor | Baking flavor, and oily flavor | | Grassy flavor, and oily flavor | |
| 1-octene-3-one | 003391-86-4 | | Mushroom flavor, and earthy flavor | Mushroom flavor, and earthy flavor | Mushroom flavor, and earthy flavor | Mushroom flavor, and earthy flavor | | Mushroom flavor, and earthy flavor | Mushroom flavor, and earthy flavor |
| 1-heptanol | 000111-70-6 | O | Musty flavor, grassy flavor, and oily flavor | Musty flavor, grassy flavor, and oily flavor | Musty flavor, grassy flavor, and oily flavor | Musty flavor, grassy flavor, and oily flavor | | | |
| 6-methyl-5-hepten-2-ol | 001569-60-4 | | | Grassy flavor | | | Greenness production, waxy flavor, and woody flavor | | |
| (E,E)-2,4-heptadienal | 004313-03-5 | O | | Oily flavor, and cinnamon flavor | | Oily flavor, and cinnamon flavor | | | |
| 1-octanol | 000111-87-5 | O | Woody flavor greenness production, | Greenness production, waxy flavor, | Greenness production, waxy flavor, | Greenness production, waxy flavor, | | Greenness production, waxy flavor, | Greenness production, waxy flavor, |

TABLE 3-continued

Results of Effects of Enzymatic Hydrolysis on Flavor of Plant Milk

| Chinese name | CAS | Olfactory | 0 | 1 | 2 | 3 | 4 | 5 | 6 |
|---|---|---|---|---|---|---|---|---|---|
| | | | and waxy flavor | and woody flavor | and woody flavor | and woody flavor | | and woody flavor | and woody flavor |
| (E,E)-3,5-octadien-2-one | 030086-02-3 | O | | Grassy flavor, and fruity flavor | | | | Grassy flavor, and fruity flavor | Grassy flavor, and fruity flavor |
| 3,5-octadien-2-one | 038284-27-4 | | | | | | Mushroom flavor, oily flavor, and fruity flavor | | |
| (E,E)-2,6-nonadienal | 017587-33-6 | O | | | Citrus flavor, and grassy flavor | Citrus flavor, cucumber flavor, and grassy flavor | Cucumber flavor, and citrus flavor | Citrus flavor, cucumber flavor, and grassy flavor | Citrus flavor, cucumber flavor, and grassy flavor |
| Pulegone | 000089-82-7 | | Grassy flavor, and minty flavor | | | | | | |
| 2-methoxyphenol | 000090-05-1 | O | | Woody flavor | | | | | |
| (E)-2-octene-1-one | 018409-17-1 | O | | Grassy flavor | | | | | |
| (E)-2-decenal | 003913-81-3 | O | | Deep fried flavor, and baking flavor | | | Deep fried flavor, and baking flavor | | Deep fried flavor, and baking flavor |
| 1-nonanol | 000143-08-8 | | | | | | | | |
| (Z)-4-heptaldehyde | 006728-31-0 | | | Cream flavor | | | | | |
| 2,4-nonadien | 006750-03-4 | | | Cucumber flavor, and citrus flavor | | | | | |
| Dodecylaldehyde | 000112-54-9 | | | | | | | | |
| Naphthalene | 000091-20-3 | | | | | | | | Irritative dry tar |
| (E,Z)-2,4-decadienal | 025152-83-4 | | | Deep fried flavor | | Deep fried flavor | Deep fried flavor | Deep fried flavor | Deep fried flavor |
| 2,4-decadienal | 002363-88-4 | | | | | | | | |
| (E,E)-2,4-decadienal | 025152-84-5 | | Oily flavor, deep fried flavor, and waxy flavor | Oily flavor, deep fried flavor, and waxy flavor | | | Oily flavor, deep fried flavor, and waxy flavor | Oily flavor, deep fried flavor, and waxy flavor | Oily flavor, deep fried flavor and waxy flavor |
| (E,E)-2,4-nonadienal | 005910-87-2 | | | | | Cucumber flavor, and citrus flavor | | | |
| Phenethyl alcohol | 000060-12-8 | | | | Rose flavor, and sweet flavor | | | | |
| 5-hexyldihydro-2 (3H)-furanone | 000706-14-9 | | | | | | | Cream flavor, fruity flavor, and | |

TABLE 3-continued

| Results of Effects of Enzymatic Hydrolysis on Flavor of Plant Milk | | | | | | | | | |
|---|---|---|---|---|---|---|---|---|---|
| Chinese name | CAS | Olfactory | 0 | 1 | 2 | 3 | 4 | 5 | 6 |
| | | | | | | | | syrupy flavor | |
| Dihydro-5-pentyl-2-furanone | 000104-61-0 | | | Cream flavor | | | | | |

Results are shown in Table 3. Compared with No. 0, enzymatically hydrolyzed flaxseed plant milk No. 1, No. 3 and No. 5 is added with the oily flavor, the sweet flavor, and the fruity flavor; the enzymatically hydrolyzed flaxseed plant milk No. 5 is added with the cream flavor, the fruity flavor, the syrup flavor, the citrus flavor, the cucumber flavor, the grassy flavor, the citrus flavor, and the fresh grassy flavor. The above data shows that different enzymatic hydrolysis treatments have different effects on the flavor of the flaxseed plant milk. In general, the flavor of the enzymatically hydrolyzed flaxseed plant milk No. 5 is better after cellulase treatment.

(5) Detection on Appearances of Enzymatically Hydrolyzed Flaxseed Plant Milk

A high-resolution camera is used to photograph and record appearances of a non-enzymatically hydrolyzed plant milk sample, and plant milk samples enzymatically hydrolyzed with the Flavourzyme 500 MG, the novo, the bromelain solarbio, the hemicellulase XS, the β-glucanase XS, the cellulase CTS novo, and the CELLUCLAST 1.5L novo, which are labeled 0-6 in sequence. Results are shown in FIG. 9.

Figure 9:
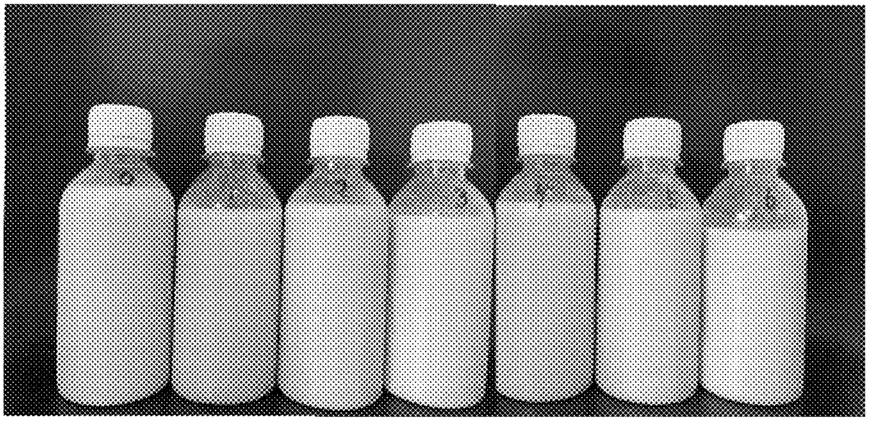
FIG. 9 is a diagram showing appearances of flaxseed plant milk subjected to different methods of enzymatic hydrolysis according to present invention.

It can be seen from FIG. 9 that enzymatic hydrolysis has different effects on the appearance of the flaxseed plant milk, wherein the enzymatically hydrolyzed of flaxseed plant milk No. 1, No. 2 and No. 4 show obvious browning, and the enzymatically hydrolyzed of flaxseed plant milk No. 3, No. 5 and No. 6 have no obvious color change.

(5) Effect of Enzymatic Hydrolysis on Particle Size and Zeta-Potential of Flaxseed Plant Milk Particle size distribution of each group of the flaxseed plant milk is determined by using the laser particle size analyzer by means of the laser diffraction technology. Results are shown in FIGS. 10-11.

Parameters are measured: a wet dispersion method is used for analysis to obtain that a refractive index of the sample is 1.480, a refractive index of the water is 1.330, a stirring rate is 2000 rpm/min, and a test temperature is 25° C.

An emulsion is diluted with deionized water at a ratio of 1:250, and the ζ zeta-potentials of the emulsion under different enzymatic hydrolysis conditions are measured by using the Malvern nanoparticle size analyzer. Results are shown in FIG. 12, wherein the non-enzymatically hydrolyzed plant milk sample, and the plant milk samples enzymatically hydrolyzed with the Flavourzyme 500 MG, the novo, the bromelain solarbio, the hemicellulase XS, the β-glucanase XS, the cellulase CTS novo, and the CELLUCLAST 1.5L novo, which are labeled 0-6 in sequence.

Figure 10:
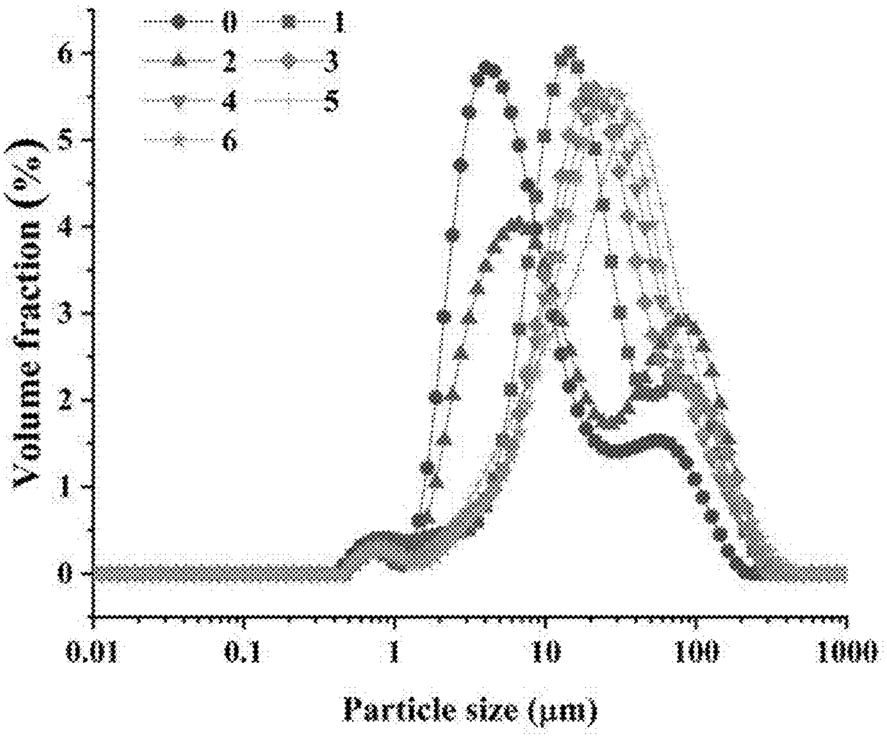
FIG. 10 is a particle size-volume fraction diagram of flaxseed plant milk subjected to different methods of enzymatic hydrolysis according to the present invention.
Figure 11:
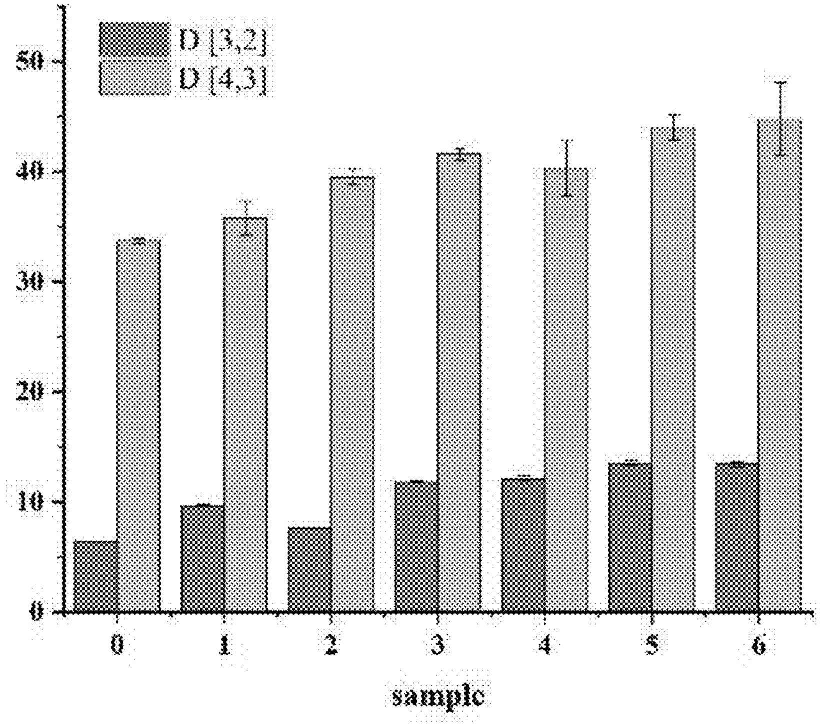
FIG. 11 is a particle size diagram of flaxseed plant milk subjected to different methods of enzymatic hydrolysis according to the present invention.
Figure 12:
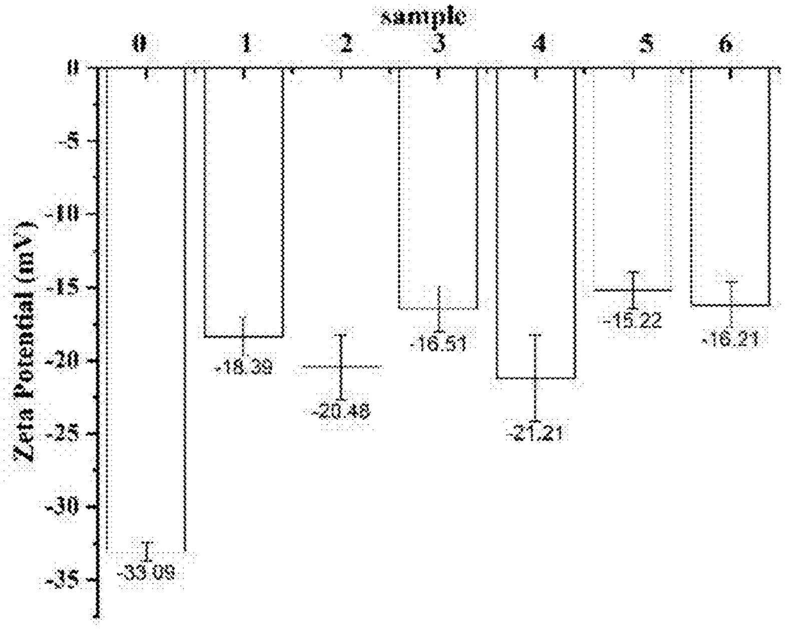
FIG. 12 is a zeta-potential diagram of flaxseed plant milk subjected to different methods of enzymatic hydrolysis according to present invention.

It can be seen from FIGS. 10-12 that enzymatic hydrolysis shows different degrees of increase in the particle size of the flaxseed plant milk, and reduces an absolute value of charges on the surfaces of the oil droplets. It is indicated that enzymatic hydrolysis may change the interface of the oil droplets in the flaxseed plant milk.

IV. Composite Homogenization Treatment on Flaxseed Plant Milk

The composite homogenization principle is based on changes on molecular structures, adsorption, rearrangement and the like of the proteins, the phospholipids, the polysaccharides and the like at the interface of the oil droplets in the flaxseed plant milk after enzymatic hydrolysis, enzyme inactivation and sterilization. By means of composite high-pressure homogenization, rearrangement of active substances at the interface of the oil droplets in the flaxseed plant milk and re-dispersion of flocculated oil droplets are promoted, and the stability of the plant milk is significantly improved.

1. Materials and Reagents

Yellow flaxseed; and cellulase, glucoamylase, and other reagents purchased from Sinopharm Chemical Reagent Co., Ltd.

2. Main Instrument and Device

Flaxseed degumming machine; Malvern 3000 laser particle size analyzer-Malvern Instruments, UK; and SNB-1 digital viscometer from Shanghai Hengping Instrument.

3. Experimental Method and Results (1) Sample preparation: after the microwave treated and degummed flaxseed is soaked at 1:7 for 2 h, the pure water is added at a ratio of 1:9, and plant milk is collected after 12 min of cyclic grinding with the colloid mill; and the plant milk is enzymatically hydrolyzed by 1 wt % cellulase and 2 wt % glucoamylase at 50° C. for 2 h, and then collected, all samples are centrifuged at 2770 rpm for 5 min, and flaxseed plant milk C is subjected to first high-pressure homogenization at a pressure of 20 MPa, and then subjected to second high-pressure homogenization at a pressure of 200 bar under the sterile condition.

(2) Detection on particle size and zeta-potential of flaxseed plant milk

Particle size distribution of the flaxseed plant milk is determined by using the laser particle size analyzer by means of the laser diffraction technology. Results are shown in FIGS. 13-14.

Parameters are measured: a wet dispersion method is used for analysis to obtain that a refractive index of the sample is 1.480, a refractive index of the water is 1.330, a stirring rate is 2000 rpm/min, and a test temperature is 25° C.

An emulsion is diluted with deionized water at a ratio of 1:250, and the ζ zeta-potentials of the emulsion under different process conditions are measured by using the Malvern nanoparticle size analyzer. Results are shown in FIG. 15.

Figure 13:
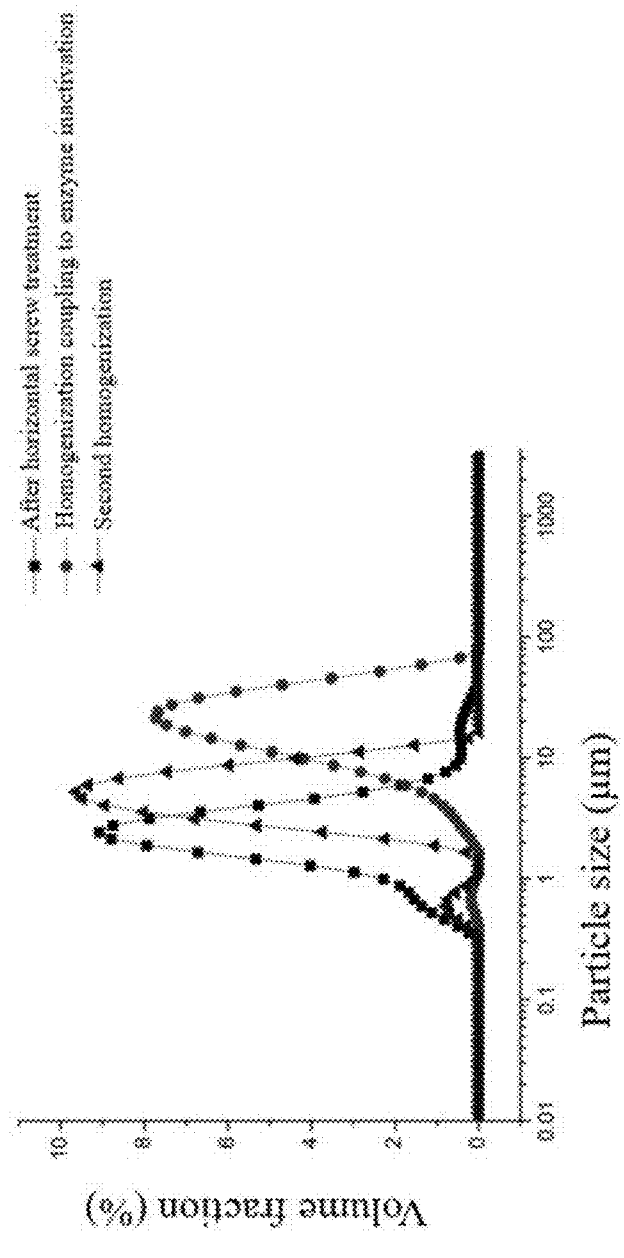
FIG. 13 is a particle size-volume fraction diagram of flaxseed plant milk subjected to different process steps according to the present invention.
Figure 14:
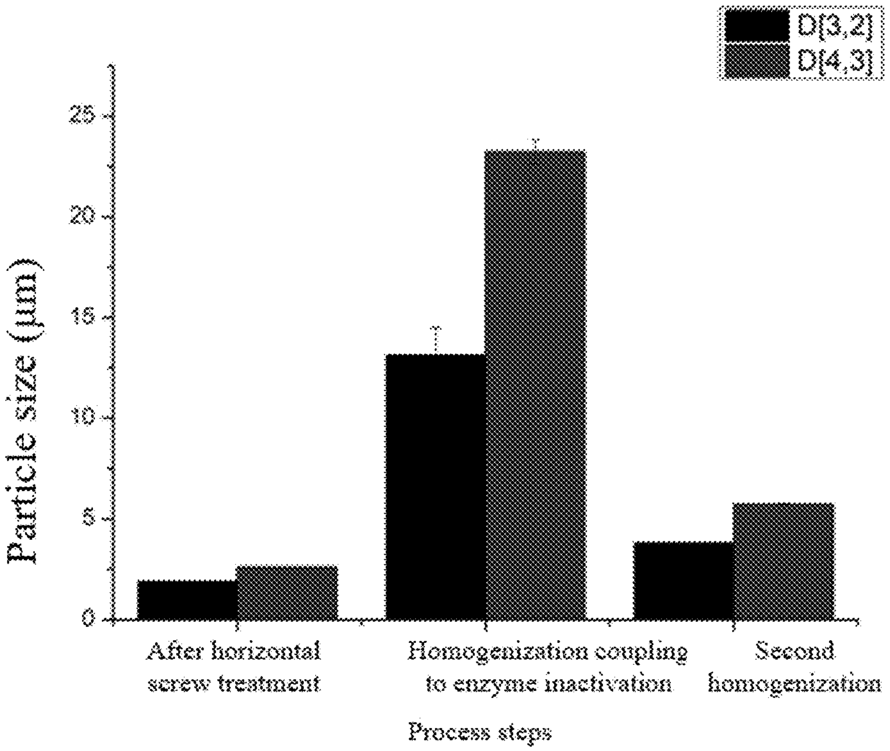
FIG. 14 is a particle size diagram of flaxseed plant milk subjected to different process steps according to the present invention.
Figure 15:
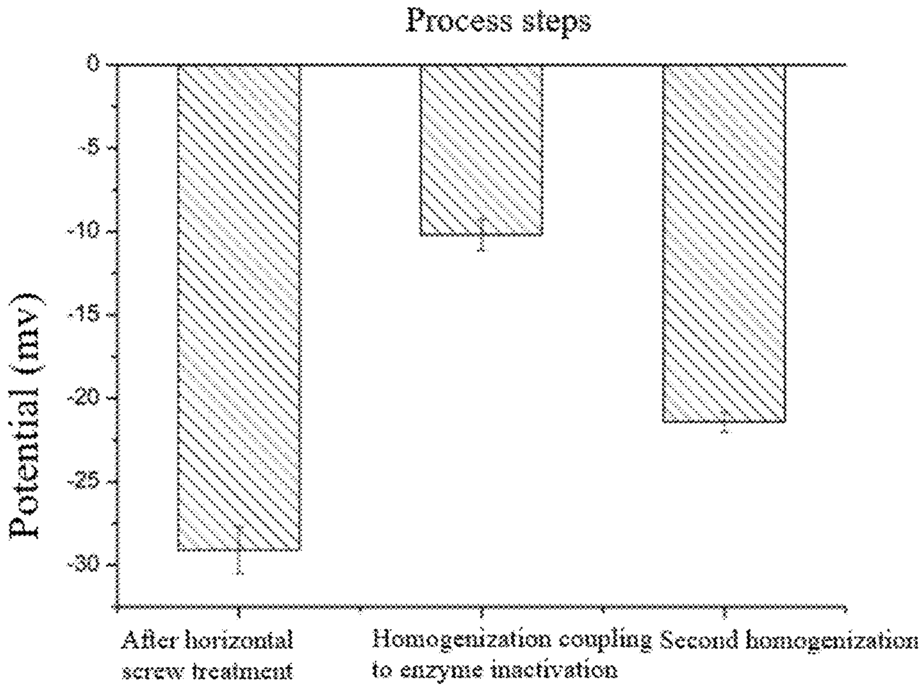
FIG. 15 is a zeta-potential diagram of flaxseed plant milk subjected to different process steps according to present invention.

As shown in FIGS. 13-15, after first high-pressure homogenization coupling to enzyme inactivation, the particle size of the flaxseed plant milk is increased greatly, and the absolute value of the zeta-potential is decreased. It is indicated that first high-pressure homogenization coupling to enzyme inactivation causes the interface of the oil droplets of the plant milk to be partially destabilized by heat. However, after UHT coupling to second high-pressure homogenization, the particle size is decreased again, and the absolute value of the zeta-potential is also increased. It is indicated that homogenization after sterilization significantly improves adsorption and distribution of the active substances such as the proteins, the phospholipids and the polysaccharides at the interface of the oil droplets in the plant milk, and promotes further stability of the oil droplets.

(3) Detection on phase separation stability of flaxseed plant milk

Figure 16:
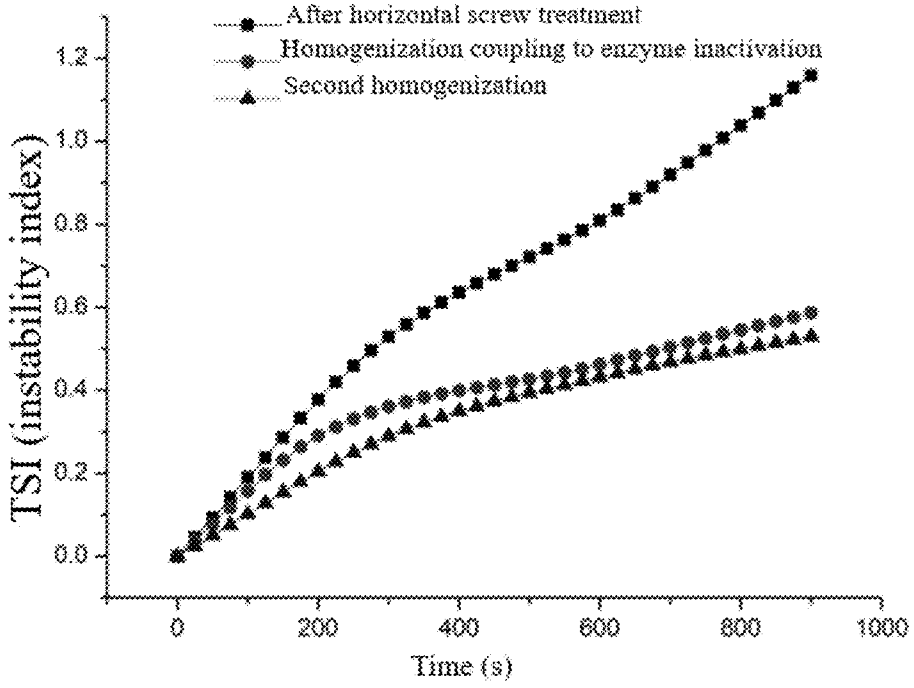
FIG. 16 is a diagram of effect on TSI of flaxseed plant milk subjected to different process steps according to the present invention.

Phase separation stability of the plant milk is determined by laser diffraction scanning. A device consists of a probe equipped with a near-infrared light source (880 nm). The probe scans a height of a sample, and collects transmission and backscattering data every 40 μm. The sample is scanned by the light source every 30 s from top to bottom, and a percentage of light back scattering or transmission is measured within 15 min at 25° C. TSI (Turbiscan stability Index) parameters calculated by Turbisoft 2.1 software are used to evaluate the stability of the plant milk. Results are shown in FIG. 16. The TSI results show that homogenization promotes the stability of the plant milk.

V. Storage Stability of Flaxseed Plant Milk

The flaxseed plant milk has reached the commercial sterile conditions after being subjected to ultra-high temperature instantaneous sterilization, homogenization after sterilization, and sterile filling. It can be stored in a closed container for a long time without worrying about decaying and deterioration caused by microorganisms. However, the flaxseed plant milk belongs to a multi-phase system. The oil droplets, the proteins/carbohydrate macromolecules, insoluble solid particles, etc. are prone to flocculation, aggregation, precipitation, floating and other instability phenomena due to the effect of attractive force. Meanwhile, oxidation of the ALA in the system also easily leads to the decrease in stability of the flaxseed plant milk. Therefore, in order to verify that the plant milk can be stored for a long time, an storage stability experiment is performed.

1. Materials and Reagents

Reagents purchased from Sinopharm Chemical Reagent Co., Ltd.

2. Main Instrument and Device

Malvern 3000 laser particle size analyzer-Malvern Instruments, UK; and SNB-1 digital viscometer from Shanghai Hengping Instrument.

3. Experimental Method and Results (1) Detection on Particle Size and Zeta-Potential of Flaxseed Plant Milk Particle size distribution of the flaxseed plant milk is determined by using the laser particle size analyzer by means of the laser diffraction technology. Results are shown in FIGS. 17-18.

Parameters are measured: the wet dispersion method is used for analysis to obtain that the refractive index of the sample is 1.480, the refractive index of the water is 1.330, the stirring rate is 2000 rpm/min, and the test temperature is 25° C.

An emulsion is diluted with deionized water at a ratio of 1:250, and the ζ zeta-potentials of the emulsion under different compounding ratio conditions are measured by using the Malvern nanoparticle size analyzer. Results are shown in FIG. 19.

Figure 17:
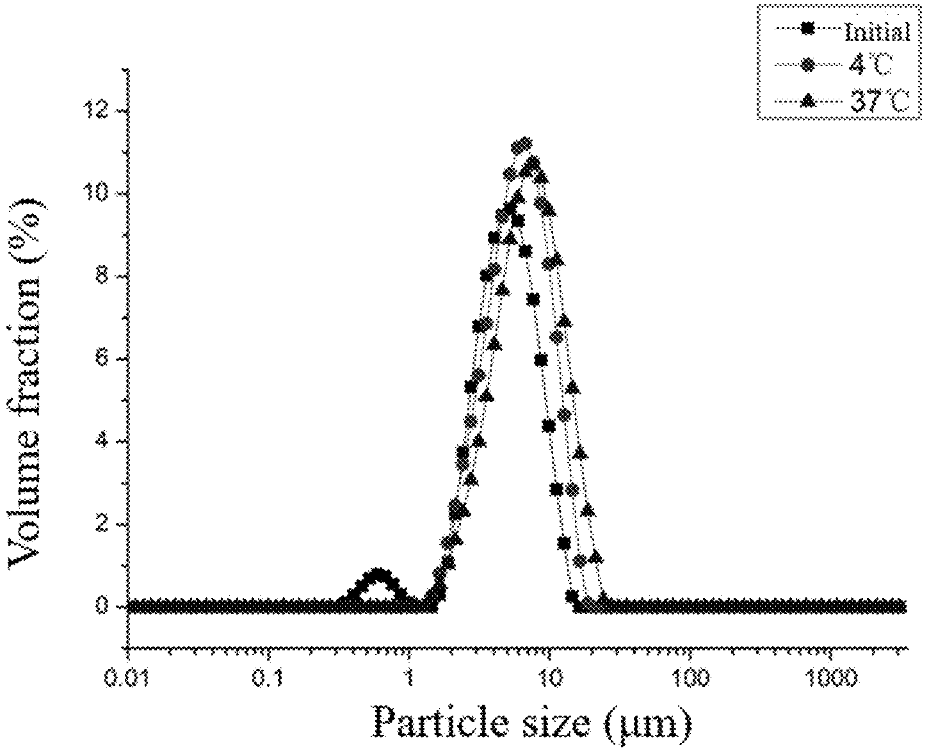
FIG. 17 is a particle size-volume fraction diagram of flaxseed plant milk at different storage temperatures according to the present invention.
Figure 18:
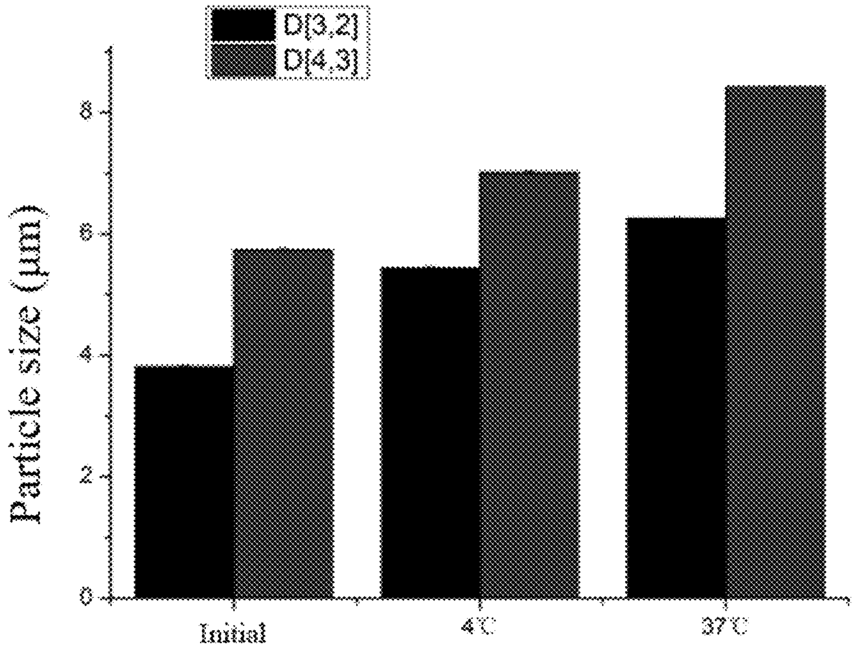
FIG. 18 is a particle size diagram of flaxseed plant milk at different storage temperatures according to the present invention.
Figure 19:
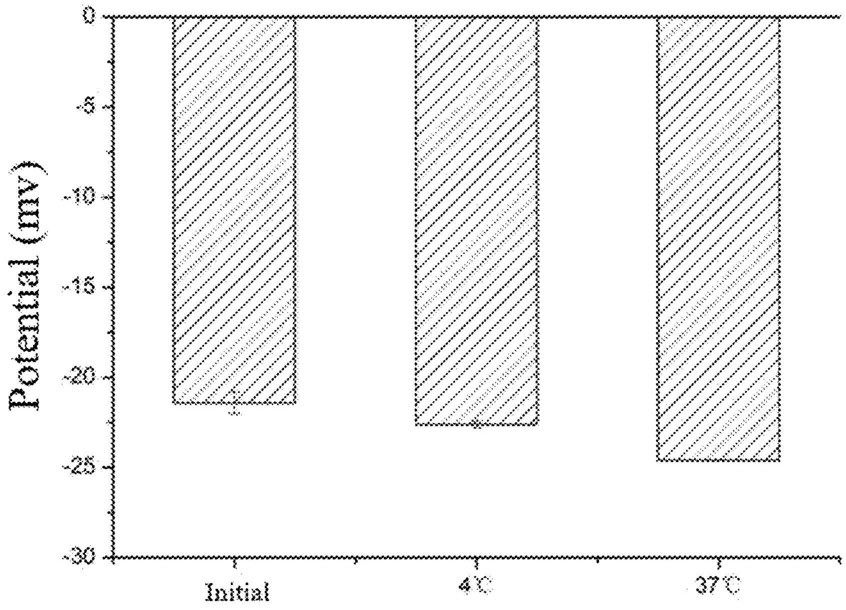
FIG. 19 is a zeta-potential diagram of flaxseed plant milk at different storage temperatures according to present invention.

As shown in FIGS. 17-19, they show that when the storage time is 6 months, and the temperatures are 4° C. and 37° C., change values of the particle size and the zeta-potential of the flaxseed plant milk are both small, which indicates that its stability is strong.

(2) Detection on Phase Separation Stability of Flaxseed Plant Milk

Figure 20:
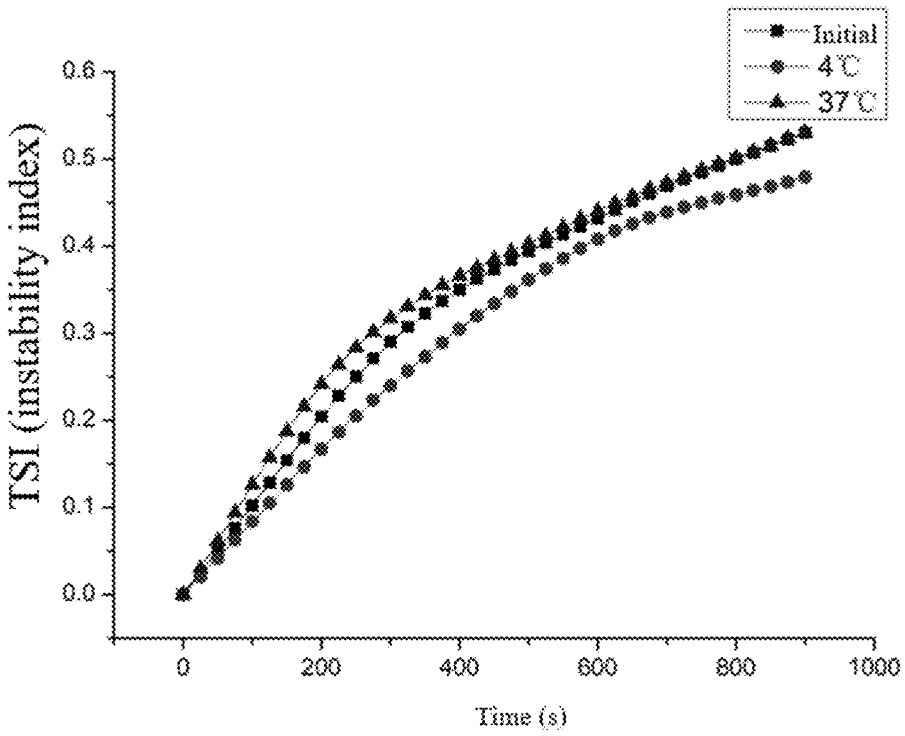
FIG. 20 is a diagram of effect on TSI of flaxseed plant milk at different storage temperatures according to the present invention.

Phase separation stability of the plant milk is determined by laser diffraction scanning. The device consists of the probe equipped with the near-infrared light source (880 nm). The probe scans the height of the sample, and collects the transmission and backscattering data every 40 μm. The sample is scanned by the light source every 30 s from top to bottom, and the percentage of light back scattering or transmission is measured within 15 min at 25° C. The TSI (Turbiscan stability Index) parameters calculated by the Turbisoft 2.1 software are used to evaluate the stability of the plant milk. Results are shown in FIG. 20. When the storage time is 6 months, and the temperatures are 4° C. and 37° C., change values of the TSI of the flaxseed plant milk are all small, which indicates that its stability is strong.

(3) Measurement on Centrifugal Sedimentation Rate of Flaxseed Plant Milk

Figure 21:
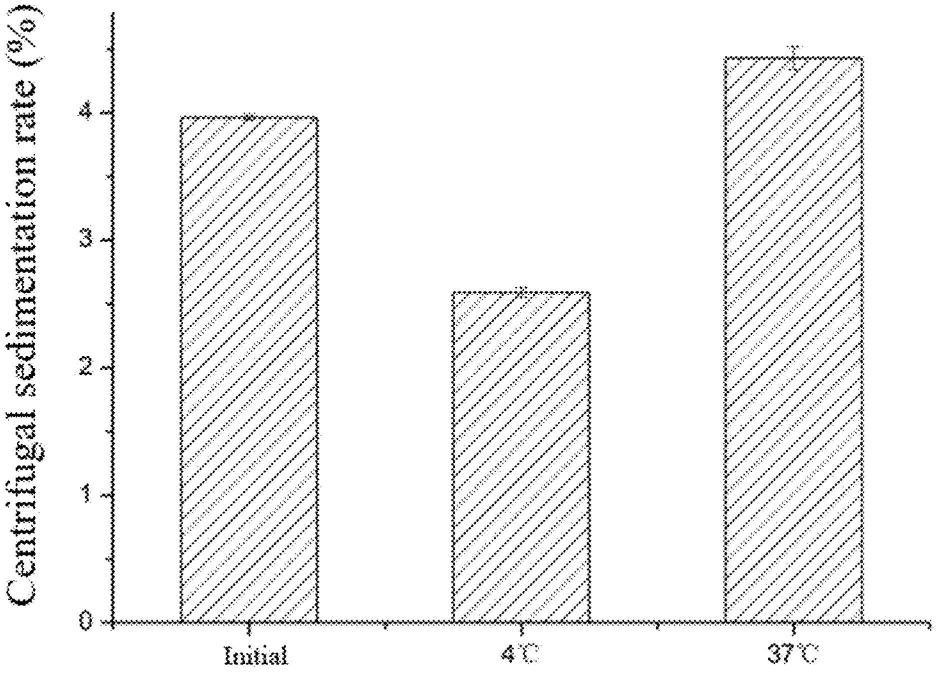
FIG. 21 is a diagram of effect on a centrifugal sedimentation rate of flaxseed plant milk at different storage temperatures according to the present invention.

After a plant milk beverage is placed for a corresponding time, it is uniformly shaken, and 10 g of the sample is accurately weighed, and centrifuged at 3000 r/min for 15 min. A weight of precipitates at a bottom of a centrifuge tube is recorded to calculate the centrifugal sedimentation rate: centrifugal sedimentation rate (%)=precipitate weight (g)/centrifugal sample weight (g)×100%. The test result takes an average value of three parallel measurements. Results are shown in FIG. 21. When the storage time is 6 months, and the temperatures are 4° C. and 37° C., the centrifugal sedimentation rates of the flaxseed plant milk are both small, which indicates that its stability is strong.

(4) Measurement on Fatty Acid Composition of Flaxseed Plant Milk

Referring to GB 5009.168-2016, about 1.5000 g of the plant milk is weighed, and put in a 10 mL plastic centrifuge tube; 2 mL of n-hexane is added; the plastic centrifuge tube is ultrasonically treated in ultrasonic equipment for 20 min; 3 mL of a 0.5 M methanol-sodium solution is added to the original test tube with residues together for mixing on a vortex mixer for 5 min; the test tube is placed in a high-speed centrifuge for centrifugation at 5000 rpm for 10 min; and a supernatant is taken for testing.

GC determination conditions: an Agilent 6890 gas chromatograph, an Agilent 7683B automatic sampler, and a hydrogen flame ionization detector (FID).

Chromatographic conditions: a chromatographic column HP-INNOWAX 30 m×0.32 mm×0.25 μm; the carrier gas used is nitrogen, and the flow rate is 1.5 mL/min; the injection volume is 1 μL; the inlet temperature is 260° C., the split ratio is 80:1, and a split flow rate is 120 mL/min; and a temperature program: the temperature is 210° C., is maintained for 9 min, is raised to 250° C. at 20° C./min, and is maintained for 10 min, without post-operation.

Figure 22:
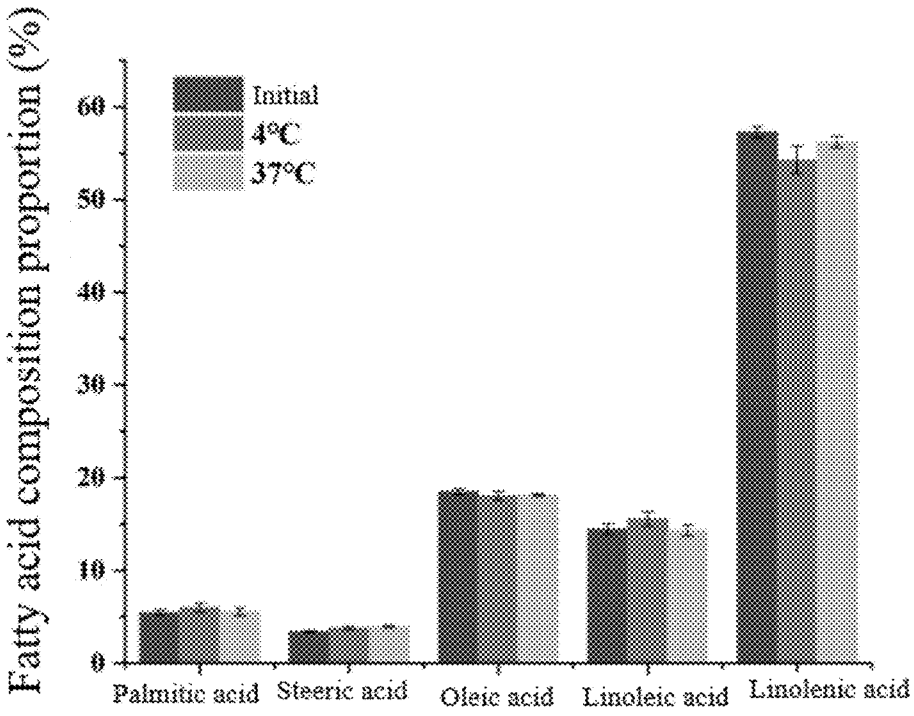
FIG. 22 is a diagram of effect on a fatty acid composition in flaxseed plant milk at different storage temperatures according to present invention.

Results are shown in FIG. 22. When the storage time of the flaxseed plant milk is 6 months, and the temperatures are 4° C. and 37° C., the fatty acid composition shows no significantly different from that of original plant milk. Particularly, the composition of the ALA still accounts for more than 55%, which indicates that the flaxseed plant milk has strong chemical stability.

VI. Evaluation on Improvement in Intestinal Microecological Function of Flaxseed Plant Milk 1. Experimental Method 60 SPF class C57BL/6 male mice are given a basic feed for free adaptive feeding for 7 days at 20±4° C. in an environment of 12 h light/dark alternate cycle and a relative humidity of 40-55%, and then randomly grouped (6 groups, n=10). It is set as follows: a normal control group (NC), a natural recovery group (CS), a flaxseed milk high and low dose group (FML (about equal to a daily recommended ALA intake dose for a human body (1.6 g/60 kg BW/day)), FMM (2 times the recommended dose, using 2 times of concentrated milk), an oat milk group (OM), and a soybean milk group (SM). Each mouse is numbered, and its weight is recorded, wherein the NC group is allowed free access to distilled water; the CS group and the plant milk group are gavaged with 400 mg/mL ceftriaxone sodium with 0.2 mL per mouse per day for 8 d; and after 8 d, the plant milk group is intragastrically given equal energy of the plant milk (FML-450 uL, FMM-450 uL, OM-400 uL and SM-330 L), and the NC group and the CS group are intragastrically given 400 uL of normal saline with each group gavaged for 14 d. During the experiment, the mice are allowed free access to foods and water, and food intakes and body weights are recorded daily. The mice are sacrificed by cervical vertebra dislocation on the 30th day of feeding, and blood samples, intestinal samples, intestinal contents, etc. of the mice are collected for subsequent experiments.

Figure 23:
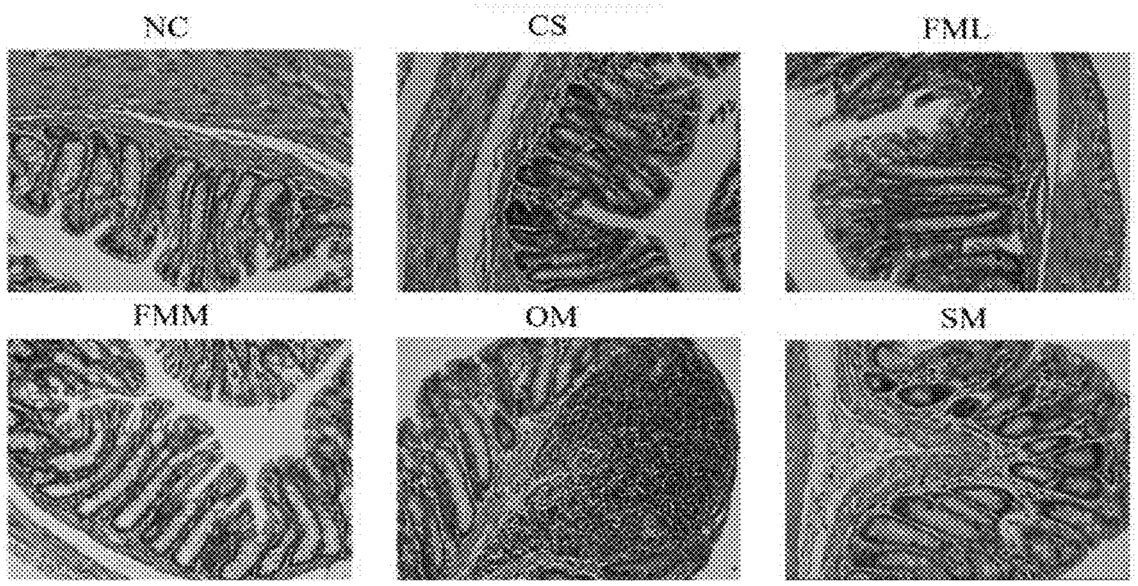
FIG. 23 is a diagram showing small intestine segment at the blind end stained with HE in an experimental group according to present invention.

2. Experimental Results 2.1 Effect of Plant Milk on Repairing Animal Colon Tissue Injury The small intestinal segments close to blind ends of 0.5 cm are taken, cleanly washed with pre-cooled sterile saline, fixed in 4% neutral formaldehyde for 24 h, dehydrated routinely, embedded in paraffin, sliced (4 μm thick), stained with HE, and finally examined by an optical microscope; and images are collected and analyzed. Results are shown in FIG. 23. Results show that in the CS group, goblet cells are decreased, crypts are destroyed and missing, and lamina propria and submucosae are infiltrated with inflammatory cells; in the NC group, colon tissues are normal in morphology, colon mucosae are intact, and crypt structures are healthy; compared with the mice treated with CS, the OM group and the SM group also show the characteristics of inflammatory cell infiltration and goblet cell disappearance; while the mice in the FMM group treated with double concentrated flaxseed milk can more restore mucosal structures to health.

2.2 Effect of Plant Milk on Intestinal Flora

Fecal samples of the mice are collected, and immediately stored at −80° C. for bioinformatics analysis. Bacterial DNA is isolated from the fecal samples by using a DNA kit. A V3-V4 variable region is amplified by PCR with primers 338 (5'-ACTCCTACGGGAGGCAGCA-3') and 806R (5'-GGACTACHVGGTWTCTAAT-3'). Amplified products are sent to Illumina MiSeq platform for sequencing. Obtained sequences are assigned to a same operational taxonomic unit (OTU), wherein similarity of the sequences is larger than or equal to 97%.

Figure 24:
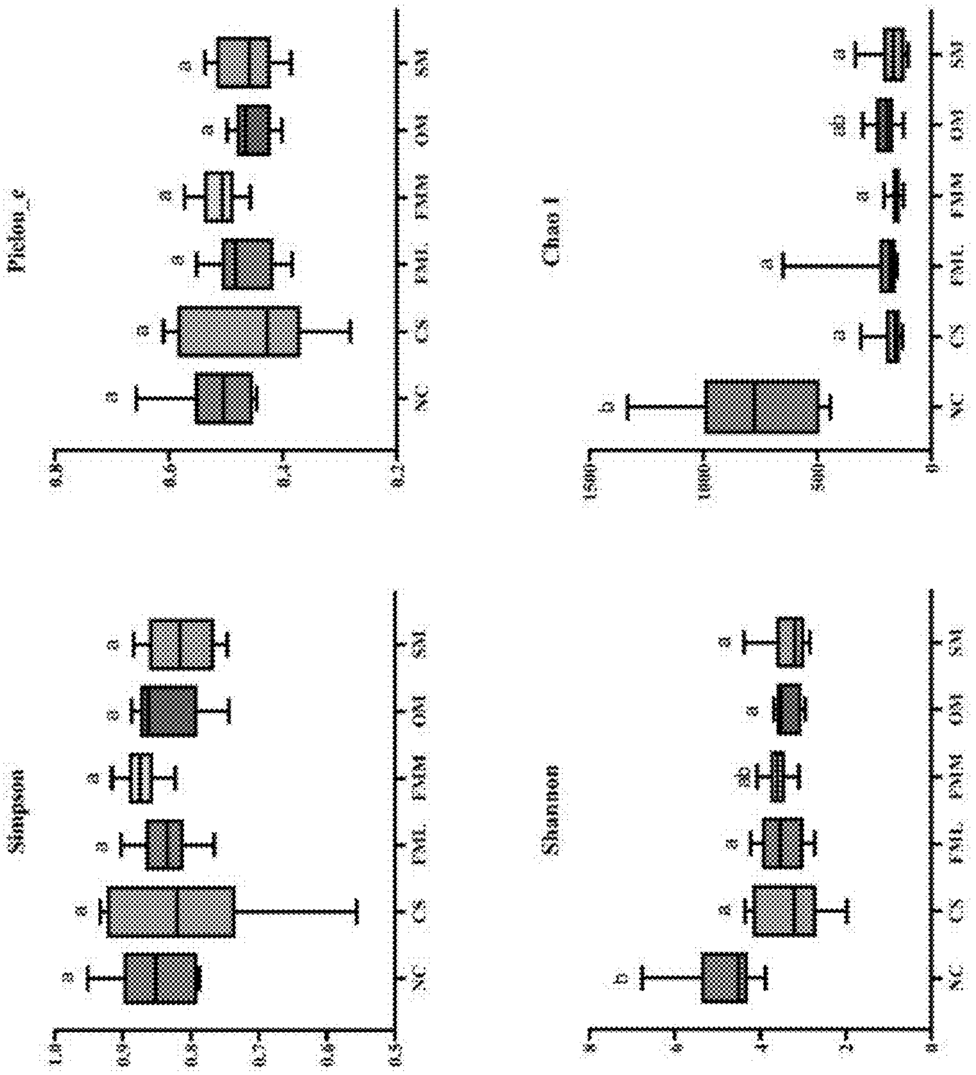
FIG. 24 is a diagram showing α-diversity indexes of an intestinal flora in an experimental group according to present invention.
Figure 25:
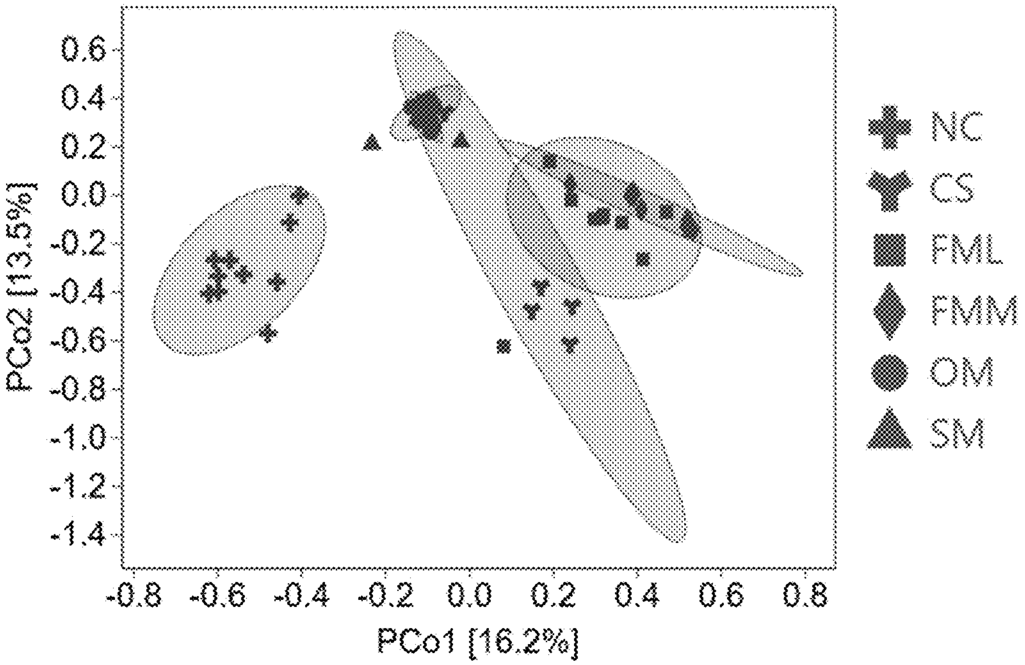
FIG. 25 is a PCoA diagram of a weighted UniFrac distance based on β-diversity of an intestinal flora in an experimental group according to present invention.
Figure 26:
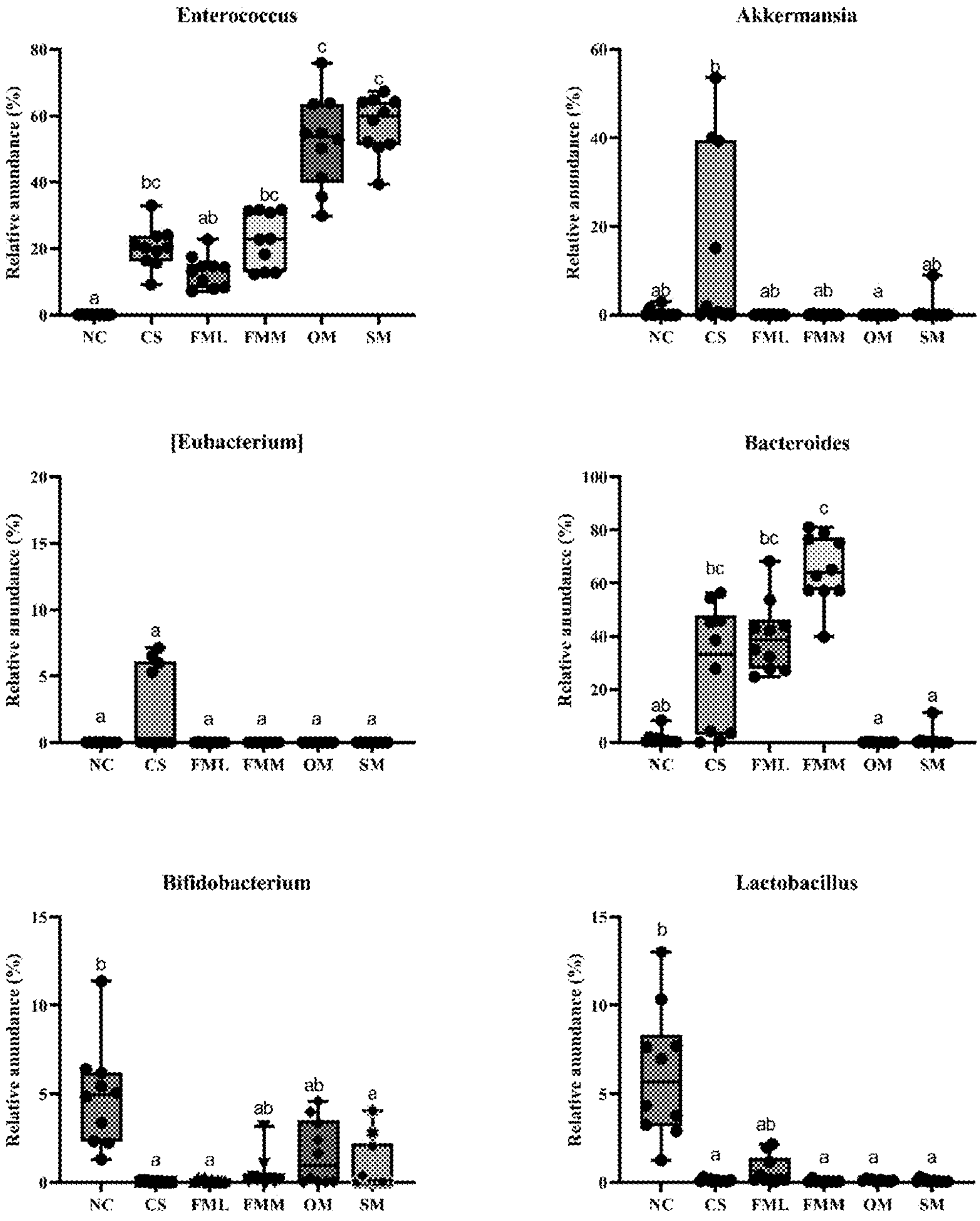
FIG. 26 is a diagram of relative abundance of representative bacteria in an experimental group on genus level according to present invention.

Shannon, Simpson, Observed Species and other indexes are used to evaluate Alpha diversity, which is used to infer diversity within the sample group, wherein the larger the values of the Shannon index and the Simpson index are, the richer the diversity composition of the samples is. Beta diversity is used for performing comparison on the diversity between sample groups. Unweighted UniFrac is used to measure β diversity (i.e., PCoA analysis), and two maximum difference features between the samples are used as coordinate axes for graphing analysis. Results are shown in FIGS. 24-26. As shown in FIG. 24 which shows Simpson, Pielou_e, Shannon and Chaol result diagrams in sequence, there is no statistical significance in comparison on the Simpson and Pielou_e indexes between the two groups. Compared with the NC group, the Chaol index and the Shannon index of the mice treated with antibiotics are significantly decreased ($P<0.05$), which indicates that antibiotic treatment can lower the abundance of a community; and under the effect of four kinds of plant milk, richness of the community has no obvious change, which may be due to a short time of antibiotic intervention. As shown in FIG. 25, the CS group in which the mice treated with the antibiotics is far away from the NC group, which indicates a large difference; and under the effect of the four kinds of plant milk, the SM group and the OM group are close to each other, and the FML group and the FMM group are close to each other, which indicates that species compositions of the SM group and the OM group are similar, and species compositions of the FML group and the FMM group are similar. As shown in FIG. 26, compared with the NC group, the relative abundance of [*Eubacterium*], *Enterococcus, Akkermansia* and [*Eubacterium*] genuses in the CS group treated with antibiotics is increased; but under the effect of the four kinds of plant milk, the relative abundance of the *Akkermansia* and *Bacteroides* genuses are lowered, and the relative abundance of *Enterococcus* genus in the OM group and the SM group is increased; and the relative abundant of the *Bacteroides* genus treated with the antibiotics is increased, but can be reduced under the effect of the OM group and the SM group. The abundance of the *Bifidobacterium* and the *Lactobacillus* in the CS group treated with the antibiotics is lowered significantly, and is not changed under the effect of the four kinds of plant milk. In an antibiotic mouse model, taking the flaxseed milk can promote the abundance of Parabacteroides genus; and taking the soybean milk and the oat milk can promote the abundance of *Lachnospiraceae Clostridium* genus.

VII. Immunity Enhancement Test of Flaxseed Plant Milk

1. Materials and Methods 1.1 Sample Source and Treatment

The flaxseed plant milk is entrusted by Oil Crops Research Institute, Chinese Academy of Agricultural Sciences to provide. The recommended daily intake for the human body is 300 mL/person/d, that is, 5 mL/kg BW (calculated according to an average weight of 60 kg body weight of adults).

1.2 Experimental Animals

SPF class KM female mice weighed 18-22 g: the first batch of 150 animals are provided by Hubei Experimental Animal Research Center, with a production license number: SCXK (E) 2020-0018, and a laboratory animal quality certificate number: NO. 42000600047363; and the second batch of 100 animals are provided by Hubei Experimental Animal Research Center with a production license number: SCXK (E) 2020-0018, and a laboratory animal quality certificate number: NO. 42000600048366.

Animal feed: provided by Wuhan Wanqian Jiaxing Biotechnology Co., LTD., having a license number: SCXK (E) 2021-0011.

Feeding environment: an SPF class animal laboratory of our center, with a temperature of 20-26° C. and a humidity of 40-70%; a license number SYXK (E) 2017-0065 is used; an equipment certificate number of the first batch of laboratory animal is NO. 00295306; and an equipment certificate number of the second batch of laboratory animal is NO. 00295999.

1.3 Main Instruments and Reagents

A microplate reader, a Multiskan GO1510 type $CO_2$ incubator, a MCO-18AIC (UV) biological microscope, and OLYMPUS CX41.

1.4 Dose Design and Grouping

The animals are divided into five experimental groups, with 50 animals in each group. The first batch of 150 animals are subjected to following three groups of experiments: an immunological experimental group I is subjected to a mouse delayed-type hypersensitivity test, an experimental group II is subjected to a carbon clearance test, and an experimental group III is subjected to a test of mouse peritoneal macrophage phagocytosing chicken erythrocytes. The second batch of 100 animals are subjected to following two groups of experiments: an immunological experimental group IV is subjected to measurement on serum hemolysin and detection on antibody-producing cells, and an experimental group V is subjected to a ConA-induced mouse lymphocyte transformation test and determination on NK cell activity.

The recommended daily intake for the human body of a subject is 300 mL/person/d, that is, 5 mL/kg BW (calculated according to the average weight of 60 kg of the adults). The flaxseed plant milk low and high dose groups are set, and the negative control group (distilled water), a Doubendou soybean milk control group and an oat milk control group are additionally set. It is designed in the experiment that the contents of the proteins in the Doubendou soybean milk control group and the oat milk control group are consistent with those of the flaxseed plant milk dose groups. A gavage volume of each mouse is 40 ml/kg BW, and the test is performed after 28 d of continuously giving each mouse the subject intragastrically.

1.5. Experimental Method 1.5.1 Preparation and Giving of Samples

The flaxseed plant milk, the Doubendou soybean milk control group and the oat milk control group are all prepared with the distilled water, and prepared when needed. A specific preparation method is shown in Table 4.

TABLE 4

Preparation Method for Flaxseed Plant Milk Concentrate

| Group | Multiple of human recommended amount | Animal dose (mL/kg BW) | Concentrate with an amount 2.5 times subject (mL) | Preparation volume (ml) |
|---|---|---|---|---|
| Flaxseed plant milk low dose group | 10 | 50 | 15 | 30 |
| Flaxseed plant milk high dose group | 20 | 100 | 30 | 30 |
| Doubendou soybean milk control group | — | — | 9.6 | 30 |
| Oat milk control group | — | — | 24 | 30 |
| Negative control group (distilled water) | — | — | — | 30 |

1.5.2 Dinitrofluorobenzene (DNFB)-Induced Delayed Type Hypersensitivity (DTH)

An ear swelling method is used: after each mouse is sensitized with 1% DNFB (prepared with acetone sesame oil solution at 1:1), a right ear is attacked with DNFB on the $5_{th}$ day. After 24 h, each animal is sacrificed, and left and right conchae are cut off, and ear pieces with a diameter of 8 mm are taken off with a puncher for weighing. A difference between the weights of the left and right ears is used for indicating a degree of DTH.

1.5.3 Detection on Antibody-Producing Cells

A Jeme improved slide method is used: defidrinated sheep blood is taken, washed with normal saline for 3 times, and centrifuged (at 2000 r/min) for 10 min, and each mouse is intraperitoneally injected with 0.2 mL of 2% (v/v) SRBC; each mouse is sacrificed by cervical vertebra dislocation after being immunized with SRBC for 4 d; its spleen is taken out, added with a Hank's solution, and ground to prepare a cell suspension; the cell suspension is filtered by a 200-mesh screen mesh, centrifuged (at 1000 r/min) for 10 min, and washed with the Hank's solution for 2 times; and finally, cells are suspended in 5 mL of an RPMI1640 medium, and counted, and a concentration of the cells is adjusted to $5\times10^6$ cells/mL.

Determination on plaques: a surface culture medium (1 g of agarose, and its volume is adjusted to 100 mL by adding double distilled water) is dissolved with heating, then put into a water bath at 45-50° C. for heat preservation, and mixed with an equal amount of a 2× Hank's solution with a pH value of 7.2-7.4; a mixture is separately charged in small test tubes with 0.5 mL for each tube; then 50 μL of 10% SRBC (v/v, prepared with an SA buffer), and 20 μL of a spleen cell suspension ($5\times10^6$ cell/mL) are added to each test tube for rapid and uniform mixing; a mixture is dumped on a slide brushed with a thin layer of agarose to serve as a parallel slice; after solidification of agar, each slide is placed on a slide holder horizontally, and incubated in a carbon dioxide incubator for 1.5 h; then, a complement diluted with the SA buffer (1:8) is added to a groove of the slide holder for a continued incubation for 1.5 h; and then hemolytic plaques are counted.

1.5.4 Determination on Serum Hemolysin

A hemagglutination method: sheep blood is taken, washed with normal saline for 3 times, and centrifuged (at 2000 r/min) for 3 min each time; deposited SRBC is prepared into a 2% (v/v) cell suspension with the normal saline; each mouse is intraperitoneally injected with 0.2 mL of the cell suspension for immunization; after 4 d, its eyeball is removed, and blood is taken in a centrifuge tube for placement for about 1 h; coagulated blood is stripped from a tube wall to fully precipitate serum; and the serum is centrifuged at 2000 r/min for 10 min to be collected.

An agglutination reaction: the serum is subjected to doubling dilution with the normal saline, and different dilution degrees of the serum is placed in a micro-hemoagglutination test plate with 100 μL per well; then 100 μL of a 0.5% (v/v) SRBC suspension is added for uniform mixing; and the micro-hemoagglutination test plate is placed in a wet plate, covered, and incubated at 37° C. for 3 h. A degree of blood cell agglutination is observed, and an antibody titre is calculated according to a level of serum agglutination.

1.5.5 Determination on NK Cell Activity

Lactate dehydrogenase (LDH) assay;

Passage of target cells (YAC-1 cells): the target cells are subjected to passage culture 24 h before the experiment, and washed with the Hank's solution for 3 times; and a concentration of the cells is adjusted to $4\times10^5$ cells/mL with an RPMI1640 complete medium.

Preparation of a spleen cell suspension (effector cells): a spleen is sterilely removed, placed in a small plate containing an appropriate amount of a sterile Hank's solution, and gently ground to prepare a single-cell suspension; the single-cell suspension is filtered through a 200-mesh screen mesh, washed with the Hank's solution for 2 times, and centrifuged for 10 min (at 1000 r/min) each time; a supernatant is discarded to eject cytoplasm; 0.5 mL of sterile water is added for 20 s; and 0.5 mL of a 2× Hank's solution is added after lysis of red blood cells for centrifugation (at 1000 r/min) for 10 min; a supernatant is discarded; cells are re-suspended with 1 mL of an RPMI 1640 complete culture medium containing 10% calf serum; living cells are counted by trypan blue staining (their number should be more than 95%); and finally, a concentration of the cells is adjusted to $2\times 10^7$ cell/mL by the RPM11640 complete culture medium.

Detection on NK cell activity: 100 μL of target cells and 100 μL of effector cells (with an effector-target ratio of 50:1) are added to a U-shaped 96-well culture plate: 100 μL of the target cells and 100 μL of a culture medium are added to a target cell natural release well, and 100 μL of the target cells and 100 μL of 1% NP40 are added to a target cell maximum release well. Three parallel wells are set for each of the above items, and cultured in an incubator with 5% $CO_2$ and at 37° C. for 4 h; then the 96-well culture plate is centrifuged at 1500 r/min for 5 min; 100 μL of a supernatant is sucked from each well, and placed in a flat-bottom 96-well culture plate; 100 μL of a LDH matrix solution is added at the same time for a reaction for 3-10 min at different room temperatures; 30 μL of 1 mol/L HCL is added to each well; and an optical density (OD) value is measured by a microplate reader at 490 nm.

1.5.6 ConA-Induced Mouse Lymphocyte Transformation Test

An MTT method is used: a spleen is sterilely removed, placed in a plate containing an appropriate amount of the sterile Hank's solution, gently ground with tweezers to prepare a single-cell suspension, the single-cell suspension is filtered through a 200-mesh screen mesh, washed with the Hank's solution for 2 times, and centrifuged for 1.8 min (at 1000 r/min) each time; then cells are suspended in 1 mL of a complete culture medium; living cells are counted by trypan blue staining (their number should be more than 95%); and a concentration of the cells is adjusted to $3\times10^6$ cells/mL. Each spleen cell suspension is added to two wells of a 24-well culture plate with 1 mL per well, wherein 75 μL of Con A solution (equivalent to 7.5 μg/mL) is added to one well, and the other well serves as a control; the 24-well culture plate is cultured in $CO_2$ incubator with 5% $CO_2$ and at 37° C. for 72 h; 0.7 mL of a supernatant is gently sucked away from each well 4 h before the end of culture, 0.7 mL of an RPMI1640 culture medium without calf serum is added; and 50 μL/well MTT (5 mg/mL) is added at the same time for continued culture for 4 h; after the end of culture, 1 mL of acidic isopropanol is added to each well for blowing and uniform mixing to make purple crystals completely dissolved; a resultant is separately charged in a 96-well culture plate; two parallel wells (100 μL/well) are set for each well; and an optical density value is measured by a microplate reader at a wavelength of 570 nm.

1.6 Data Processing and Result Determination

The SPSS software, a one-way analysis of variance method and a method of paired mean value comparison between a plurality of experimental groups and a control group are used to compare a difference between the dose groups and the control group. If there is a significant and enhanced difference between any one of the dose groups and the control group ($P<0.05$), the experiment is positive.

Analysis of variance is generally used, but it is necessary to test homogeneity of variance according to a program of analysis of variance. If there is a homogeneous variance, an F value is calculated to be smaller than F0.05. It is concluded that there is no significant difference between the mean values of various groups. If the F value is larger than or equal to F0.05, P is smaller than or equal to 0.05, the method of paired mean value comparison between the plurality of experimental groups and the control group is used for statistically analysis.

Appropriate variable conversion is performed on non-normal data or data with non-homogeneous variances. After the requirements for normality or variance homogeneity are met, the converted data is used for statistically analysis. If a purpose of normality or variance homogeneity is not achieved yet after variable conversion, it is switched to use a rank sum test for statistically analysis.

2. Results

2.1 Effect on Mouse Weight

By comparing five experimental groups with the negative control group, subject samples have no significant effect on weights of the mice in various dose groups, and there is no obvious difference ($P>0.05$). Results are shown in Tables 5-9.

TABLE 5

Effect of Flaxseed Plant Milk on Weights of Mice in First Group (Mean ± Standard Deviation)

| Group | Dose (mL/kg BW) | Number of animals (mouse) | Weight before test (g) | Weight after test (g) | Weight gain (g) |
|---|---|---|---|---|---|
| Negative control group | 0 | 10 | 23.5 ± 1.1 | 32.5 ± 2.6 | 9.0 ± 1.8 |
| Doubendou soybean milk control group | 0 | 10 | 23.3 ± 1.1 | 33.2 ± 2.5 | 9.9 ± 2.7 |
| Oat milk control group | 0 | 10 | 23.3 ± 1.1 | 32.9 ± 2.2 | 9.6 ± 2.4 |
| Low dose group | 50 | 10 | 23.2 ± 0.8 | 33.4 ± 2.7 | 10.2 ± 2.8 |
| High dose group | 100 | 10 | 22.9 ± 0.6 | 32.8 ± 1.8 | 9.9 ± 1.6 |

Note:
compared with the negative control group, P > 0.05.

TABLE 6

Effect of Flaxseed Plant Milk on Weights of Mice in Second Group (Mean ± Standard Deviation)

| Group | Dose (mL/kg BW) | Number of animals (mouse) | Weight before test (g) | Weight after test (g) | Weight gain (g) |
|---|---|---|---|---|---|
| Negative control group | 0 | 10 | 23.0 ± 1.0 | 33.2 ± 2.4 | 10.2 ± 2.2 |
| Doubendou soybean milk control group | 0 | 10 | 23.8 ± 1.4 | 36.1 ± 3.8 | 12.3 ± 3.3 |
| Oat milk control group | 0 | 10 | 23.4 ± 1.6 | 34.4 ± 2.8 | 11.0 ± 2.5 |
| Low dose group | 50 | 10 | 23.2 ± 1.1 | 35.0 ± 3.0 | 11.7 ± 3.1 |
| High dose group | 100 | 10 | 24.0 ± 1.2 | 33.5 ± 3.9 | 9.5 ± 3.7 |

Note:
compared with the negative control group, P > 0.05.

TABLE 7

Effect of Flaxseed Plant Milk on Weights of Mice in Third Group (Mean ± Standard Deviation)

| Group | Dose (mL/kg BW) | Number of animals (mouse) | Weight before test (g) | Weight after test (g) | Weight gain (g) |
|---|---|---|---|---|---|
| Negative control group | 0 | 10 | 23.0 ± 2.8 | 35.1 ± 3.8 | 12.1 ± 2.5 |
| Doubendou soybean milk control group | 0 | 10 | 23.5 ± 1.8 | 34.9 ± 2.9 | 11.5 ± 2.5 |
| Oat milk control group | 0 | 10 | 23.3 ± 2.1 | 37.0 ± 3.9 | 13.7 ± 4.0 |
| Low dose group | 50 | 10 | 23.1 ± 0.9 | 35.1 ± 3.6 | 12.0 ± 3.3 |
| High dose group | 100 | 10 | 23.4 ± 1.7 | 33.6 ± 1.9 | 10.2 ± 1.6 |

Note:
compared with the negative control group, P > 0.05.

TABLE 8

Effect of Flaxseed Plant Milk on Weights of Mice in Fourth Group (Mean ± Standard Deviation)

| Group | Dose (mL/kg BW) | Number of animals (mouse) | Weight before test (g) | Weight after test (g) | Weight gain (g) |
|---|---|---|---|---|---|
| Negative control group | 0 | 10 | 23.5 ± 2.1 | 34.6 ± 2.6 | 11.2 ± 1.7 |
| Doubendou soybean milk control group | 0 | 10 | 22.5 ± 1.5 | 35.8 ± 4.3 | 13.3 ± 4.7 |
| Oat milk control group | 0 | 10 | 23.0 ± 1.8 | 36.2 ± 4.0 | 13.2 ± 3.0 |
| Low dose group | 50 | 10 | 24.1 ± 1.8 | 34.9 ± 2.6 | 10.8 ± 2.4 |
| High dose group | 100 | 10 | 23.8 ± 1.7 | 34.7 ± 2.7 | 11.0 ± 2.5 |

Note:
compared with the negative control group, P > 0.05.

TABLE 9

Effect of Flaxseed Plant Milk on Weights of Mice in Fifth Group (Mean ± Standard Deviation)

| Group | Dose (mL/kg BW) | Number of animals (mouse) | Weight before test (g) | Weight after test (g) | Weight gain (g) |
|---|---|---|---|---|---|
| Negative control group | 0 | 10 | 23.4 ± 1.4 | 35.8 ± 1.9 | 12.5 ± 3.1 |
| Doubendou soybean milk control group | 0 | 10 | 22.5 ± 1.8 | 35.4 ± 2.9 | 12.9 ± 2.9 |
| Oat milk control group | 0 | 10 | 23.4 ± 1.5 | 36.7 ± 3.5 | 13.3 ± 4.1 |
| Low dose group | 50 | 10 | 22.6 ± 0.7 | 36.6 ± 2.2 | 14.0 ± 2.0 |
| High dose group | 100 | 10 | 23.2 ± 1.6 | 37.1 ± 4.9 | 13.9 ± 4.6 |

Note:
compared with the negative control group, P > 0.05.

2.2 Effect on Detection on Mouse Antibody-Producing Cells

Compared with the negative control group, each flaxseed plant milk dose group cannot obviously increase the number of hemolytic plaques in the mice (P>0.05). See Table 10.

TABLE 10

Effect on Function of Antibody-Producing Cells and Titer Level of Hemolysin (Mean ± Standard Deviation)

| Group | Dose (mL/kg BW) | Number of animals (mouse) | Number of hemolytic plaques (/$10^6$ spleen cells) | Serum hemolysin (Antibody titre) |
|---|---|---|---|---|
| Negative control group | 0 | 10 | 216.0 ± 19.55 | 73.7 ± 9.7 |
| Doubendou soybean milk control group | 0 | 10 | 220.0 ± 15.63 | 74.9 ± 12.9 |
| Oat milk control group | 0 | 10 | 216.0 ± 17.13 | 77.9 ± 10.6 |
| Low dose group | 50 | 10 | 211.0 ± 17.29 | 76.0 ± 12.5 |
| High dose group | 100 | 10 | 227.0 ± 18.29 | 74.8 ± 15.4 |

Note:
compared with the negative control group, P > 0.05.

2.3 Effect on Titer Level of Serum Hemolysin in Mice

Compared with the negative control group, each flaxseed plant milk dose group cannot obviously increase an antibody titre in serum in the mice (P>0.05). See Table 10.

2.4 Effect on Delayed Type Hypersensitivity of Mice

Compared with the negative control group, the flaxseed plant milk low dose group can enhance DNFB-induced DTH in the mice (P<0.05). Compared with the oat milk control group, the flaxseed plant milk low dose group and the flaxseed plant milk high dose group can enhance DNFB-induced DTH in the mice (P<0.05). See Table 11.

TABLE 11

Effect of Flaxseed Plant Milk on Ear Weight After DNFB-Induced DTH (Mean ± Standard Deviation)

| Group | Dose (mL/kg BW) | Number of animals (mouse) | Weight different between left and right ears after DNFB-induced DTH (mg) |
|---|---|---|---|
| Negative control group | 0 | 10 | 20.1 ± 4.2 |
| Doubendou soybean milk control group | 0 | 10 | 22.6 ± 8.2 |
| Oat milk control group | 0 | 10 | 19.5 ± 3.8 |

TABLE 11-continued

Effect of Flaxseed Plant Milk on Ear Weight After DNFB-Induced DTH (Mean ± Standard Deviation)

| Group | Dose (mL/kg BW) | Number of animals (mouse) | Weight different between left and right ears after DNFB-induced DTH (mg) |
|---|---|---|---|
| Low dose group | 50 | 10 | 25.6 ± 4.3*## |
| High dose group | 100 | 10 | 24.3 ± 5.5# |

Note:
*compared with the negative control group, $P < 0.05$;
#compared with the oat milk control group, $P < 0.05$; and compared with the oat milk control group, $P < 0.01$.

2.5 Effect on Mouse Lymphocyte Transformation

Compared with the negative control group, the flaxseed plant milk high dose group can obviously enhance a proliferation ability of spleen lymphocytes induced by ConA in the mice (P<0.05). See Table 12.

TABLE 12

Effect on Anti-ConA Induced Spleen Lymphocyte Proliferation and NK Cell Activity (Mean ± Standard Deviation)

| Group | Dose (mL/kg BW) | Number of animals (mouse) | OD difference for ConA induced spleen lymphocyte proliferation | NK cell activity (%) |
|---|---|---|---|---|
| Negative control group | 0 | 10 | 0.051 ± 0.015 | 0.46 ± 0.06 |
| Doubendou soybean milk control group | 0 | 10 | 0.053 ± 0.008 | 0.50 ± 0.07 |
| Oat milk control group | 0 | 10 | 0.054 ± 0.008 | 0.49 ± 0.07 |
| Low dose group | 50 | 10 | 0.057 ± 0.009 | 0.51 ± 0.06 |
| High dose group | 100 | 10 | 0.062 ± 0.009* | 0.55 ± 0.07*# |

Note:
*compared with the negative control group, $P < 0.05$.
#compared with the Doubendou soybean milk control group, $P < 0.05$.

2.6 Effect on NK Cell Activity in Mice

Compared with the negative control group and the Doubendou soybean milk control group, the flaxseed plant milk high dose group can obviously enhance the NK cell activity in the mice (P<0.05); and there is no significant change in the other dose groups. See Table 12.

3. Conclusion

SPF class KM female mice are selected as an experimental system to perform a test and research of enhancing an immunity function. According to a daily recommended intake of the flaxseed plant milk of 300 mL/person/d for a population, that is, 5 mL/kg BW (calculated according to the average weight of 60 kg of the adults), the flaxseed plant milk low dose group and the flaxseed plant milk high dose group (equivalent to 10 times and 20 times of the recommended amount for the population) are designed, and the negative control group (the distilled water), the Doubendou soybean milk control group and the oat milk control group are set at the same time. The mice are tested after 28 d of continuous intragastric administration, and experimental results are judged as a significant difference by P<0.05. The results show that the flaxseed milk, the soybean milk and the oat milk have no obvious effect on the weights of the mice. Compared with the negative control group, the flaxseed plant milk low dose group can enhance the DNFB-induced delayed type hypersensitivity (DTH) in the mice, with an increase of 27.4%, which is 31.3% higher than that of the oat milk. Compared with the negative control group, the flaxseed plant milk high dose group can enhance the proliferation ability of spleen lymphocytes induced by ConA in the mouse by 21.6%. Compared with the negative control group, the Doubendou soybean milk and the oat milk, a viability of the NK cells in mouse is enhanced by 19.6%, 10% and 12.2% respectively.

The above description of the disclosed embodiments enables those skilled in the art to realize or use the present invention. Many modifications made to these embodiments will be apparent to those skilled in the art. General principles defined herein can be realized in other embodiments without departing from the spirit or scope of the present invention. Therefore, the present invention will not be limited to these embodiments shown herein, but will conform to the widest scope consistent with the principles and novel features disclosed herein.

What is claimed is:

1. A preparation method of flaxseed plant milk with a good flavor and functional activity based on interface control, comprising the following steps:

(1) pretreating flaxseed by degumming, microwave cooking and soaking for softening in sequence for standby, wherein the degumming uses dry degumming, and conditions of the microwave cooking are as follows: a microwave temperature range is 115-145° C., a microwave time range is 3-12 min, and a water content range of the flaxseed is 8-20%;

(2) performing colloid grinding, enzymatic hydrolysis and slag removal on the flaxseed obtained by the soaking for softening in sequence, to obtain flaxseed plant milk A, wherein an enzyme used in the enzymatic hydrolysis in step (2) is any one of cellulase, glucoamylase, protease, pectase, and phytase, and for the enzymatic hydrolysis, a temperature is 45-55° C., a time is 30-120 min, and an addition amount range is 0.01-2%; and (3) performing first high-pressure homogenization, enzyme inactivation, sterilization, and second high-pressure homogenization on the flaxseed plant milk A in sequence, to obtain the flaxseed plant milk with the good flavor and functional activity based on interface control, wherein a pressure range for the first high-pressure homogenization is 5-20 MPa; and a pressure range for the second high-pressure homogenization is 50-200 bar.

2. The preparation method of the flaxseed plant milk with the good flavor and functional activity based on the interface control according to claim 1, wherein a solid-liquid mass ratio for the soaking for softening in step (1) is 1:(5-10), and a soaking time range is 2-24 h.

3. The preparation method of the flaxseed plant milk with the good flavor and functional activity based on the interface control according to claim 1, wherein a colloid grinding time range in step (2) is 10-210 min; and a solid-liquid mass ratio of the flaxseed to water is 1:(5-10); and the slag removal used is horizontal screw slag removal, and a rotating speed range is 2500-3000 rpm.

4. The preparation method of the flaxseed plant milk with the good flavor and functional activity based on the interface control according to claim 1, wherein in step (3), for the enzyme inactivation, a temperature range is 90-115° C., and a time range is 15-300 s; and the sterilization uses UHT sterilization at a temperature of 135-140° C. for 8-30 s.

5. The preparation method of the flaxseed plant milk with the good flavor and functional activity based on the interface control according to claim 1, further comprising sterilely filling the flaxseed plant milk with the good flavor and functional activity, wherein a filling temperature range is 25-40° C. and filling comprises any one of filling with a paper bag, a PET bottle, a glass can and an aluminum can.

* * * * *